(12) United States Patent
Goergen et al.

(10) Patent No.: US 12,700,731 B2
(45) Date of Patent: Aug. 4, 2026

(54) FAULT MANAGED POWER METHOD FOR AC POWERING SYSTEMS

(71) Applicant: Cisco Technology, Inc., San Jose, CA (US)

(72) Inventors: Joel Richard Goergen, Soulsbyville, CA (US); Elizabeth Kochuparambil, Morgan Hill, CA (US); Chad M. Jones, Doylestown, OH (US); John W. Beecroft, Camarillo, CA (US); Jason Dewayne Potterf, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 19/042,109

(22) Filed: Jan. 31, 2025

(65) Prior Publication Data

US 2026/0180324 A1 Jun. 25, 2026

Related U.S. Application Data

(60) Provisional application No. 63/738,000, filed on Dec. 23, 2024.

(51) Int. Cl.
*H02J 9/06* (2006.01)
*H02H 1/00* (2006.01)
(Continued)

(52) U.S. Cl.
CPC .................................. *H02J 3/0012* (2020.01)

(58) Field of Classification Search
CPC ........ Y02B 70/10; H02M 1/32; H02M 1/007; G01R 31/52; H02J 9/062; H02J 3/381;
(Continued)

(56) References Cited

U.S. PATENT DOCUMENTS 5,315,533 A * 5/1994 Stich ....................... H02J 9/062
700/298
5,602,462 A * 2/1997 Stich ....................... H02J 9/062
307/64
(Continued)

FOREIGN PATENT DOCUMENTS

CN 113740760 A 12/2021
WO 2020227045 A1 11/2020
WO 2022081778 A1 4/2022

OTHER PUBLICATIONS

Alexander, C.K., "Fundamentals of Electric Circuits," Indian Edition, McGraw Hill Education, MATLAB Examples, 2013, pp. 1-37.
(Continued)

*Primary Examiner* — Elim Ortiz
(74) *Attorney, Agent, or Firm* — Edell, Shapiro & Finnan, LLC

(57) ABSTRACT

Techniques for alternating current (AC) powering methods deployed at a power transmitter and a power receiver for line fault detection. AC power is applied to a pair of lines at a power transmitter to transmit the AC power to a power receiver. An occurrence of a predetermined characteristic of an AC voltage waveform or an AC current waveform is detected. The AC power is disconnected from the pair of lines upon detecting occurrence of the predetermined characteristic. Fault detection is performed during a safety check time window upon disconnecting the AC power from the pair of lines. The AC power is reconnected to the pair of lines when a fault is not detected from the fault detection during the safety check time window, and the AC power is maintained disconnected from the pair of lines when a fault is detected during the safety check time window.

26 Claims, 29 Drawing Sheets

(51) Int. Cl.
    *H02J 3/0012* (2026.01)
    *H02M 3/335* (2006.01)
(58) Field of Classification Search
    CPC ..... H02J 2101/24; H02J 3/0012; Y02E 10/56;
                    Y02E 60/10; H02H 1/0015
    USPC .............. 307/66, 87; 361/42, 86, 87, 71, 79;
                    700/293; 702/64
    See application file for complete search history.

(56)                   References Cited

U.S. PATENT DOCUMENTS

| | | |
|---|---|---|
| 7,566,987 B2 | 7/2009 | Black et al. |
| 8,068,937 B2 | 11/2011 | Eaves |
| 8,638,008 B2 | 1/2014 | Baldwin et al. |
| 8,768,528 B2 | 7/2014 | Millar et al. |
| 8,781,637 B2 | 7/2014 | Eaves |
| 9,184,795 B2 | 11/2015 | Eaves |
| 9,419,436 B2 | 8/2016 | Eaves et al. |
| 9,853,689 B2 | 12/2017 | Eaves |
| 9,893,521 B2 | 2/2018 | Lowe et al. |
| 10,263,526 B2 | 4/2019 | Sandusky et al. |
| 10,468,879 B2 | 11/2019 | Eaves |
| 10,541,543 B2 | 1/2020 | Eaves |
| 10,714,930 B1 | 7/2020 | Weiss et al. |
| 10,735,105 B2 | 8/2020 | Goergen et al. |
| 10,790,997 B2 | 9/2020 | Jones et al. |
| 11,061,456 B2 | 7/2021 | Jones et al. |
| 11,063,630 B2 | 7/2021 | Arduini et al. |
| 2007/0011547 A1 | 1/2007 | Karam |
| 2010/0045302 A1 | 2/2010 | Karam |
| 2015/0372826 A1 | 12/2015 | Blaut et al. |
| 2016/0142217 A1 | 5/2016 | Gardner et al. |
| 2016/0294500 A1 | 10/2016 | Chawgo et al. |
| 2016/0294568 A1 | 10/2016 | Chawgo et al. |
| 2017/0229886 A1 | 8/2017 | Eaves |
| 2018/0098201 A1 | 4/2018 | Torello et al. |
| 2018/0313886 A1 | 11/2018 | Mlyniec et al. |
| 2019/0097457 A1 | 3/2019 | Hazani |
| 2019/0165691 A1* | 5/2019 | Telefus .................. H02M 3/06 |
| 2019/0280895 A1 | 9/2019 | Mather et al. |
| 2020/0295955 A1 | 9/2020 | O'Brien et al. |
| 2020/0326764 A1 | 10/2020 | Goergen et al. |
| 2020/0366079 A1* | 11/2020 | Telefus .................. H02H 3/08 |
| 2020/0389329 A1 | 12/2020 | Jones et al. |
| 2021/0266188 A1 | 8/2021 | Goergen et al. |
| 2022/0021195 A1 | 1/2022 | Rathi et al. |
| 2022/0190587 A1 | 6/2022 | Eaves et al. |
| 2024/0162703 A1 | 5/2024 | Potterf et al. |
| 2024/0288482 A1 | 8/2024 | Rajapakse et al. |
| 2024/0339825 A1 | 10/2024 | Telefus et al. |

OTHER PUBLICATIONS

Audio/video, Information and Communication Technology Equipment—Part 1: Safety requirements, International Standard, IEC 62368-1, Edition 2.0, Feb. 2014, ISBN 978-2-8322-1405-3, pp. 1-680.
Berkeley Lab ETA, "Touch-Safe, High Voltage Digital Electricity Transmission Using Packet Energy Transfer," Vimeo, https://vimeo.com/172469008, Mar. 8, 2016, 8 pages.
Curtis P., et al., "EMI Reduction Technique, Dual Random Spread Spectrum", Texas Instruments Application note, SNVA974A, Jun. 2020, Revised Nov. 2022, pp. 1-8.
"Digital Electricity Gen2 Detailed Installation Manual," Voltserver Digital Electricity, Rev B.1, Nov. 29, 2017, 68 Pages.
Eaves S.S., "Network Remote Powering Using Packet Energy Transfer," Proceedings of IEEE International Conference on Telecommunications Energy (INTELEC), Sep. 30, 2012-Oct. 4, 2012, Scottsdale, AZ, pp. 1-5.
Edelstein S., "Updated 2016 Tesla Model S also Gets New75-kWh Battery Option," Voltserver Exhibit 1018, May 5, 2016, Archived on Jun. 19, pp. 1-3, Retrieved on Feb. 6, 2021,2016 by Internet Archive Wayback machine at https://web.archive.org/ web/20160619001148/https://www.greencarreports.com/news/1103782_updated-2016-tesla-model-s-also-gets-new-75-kwh-battery-option.
Effects of Current on Human Beings and Livestok—Part 1: General Aspects, Technical Specification, Basic Safety Publication, IEC/TS 60479-1, Edition 4.0, Jul. 2005, ISBN 2-8318-8096-3, pp. 1-122.
"Electrical—Computer Conference Proceedings," Internet Archive WayBack Machine Search for Intelec 2012, Curran Associates, Inc., http://www.proceedings.com/electrical-computer-proceedings.html, 2012, 125 pages.
Hall S.H., et al., "High-Speed Digital System Design, A Handbook of Interconnect Theory and Design Practices," Voltserver Exhibit 1030, Aug. 25, Sep. 2000, pp. 1-55.
Information Technology Equipment—Safety- Part 1: General Requirements, International Standard, IEC 60950-1, Edition 2.2, May 2013, ISBN 978-2-8322-0820-5, pp. 1-648.
International Search Report and Written Opinion for International Application No. PCT/US2022/038819, dated Nov. 15, 2022, 15 pages.
"International Telecommunications Energy Conference: [proceedings] (Full Record)," Library Catalog, https://catalog.oc.gov/vwebv/holdingsInfosearchId=3810recPointer=OrecCount=25searchType=1 bibId=11348322, retrieved from the Internet Feb. 12, 2021,4 pages.
"International Telecommunications Energy Conference: [proceedings] (Marc Tags)," Library Catalog, https://catalog.loc.gov/vwebv/staffViewsearchId=3877recPointer=OrecCount=25searchType=1amp;bibId=11348322, retrieved from the Internet Feb. 12, 2021,3 pages.
Lathi B.P., et al., "Modern Digital and Analog Communication Systems," Fourth Edition, Jan. 2009, pp. 1-15.
LC Catalog-Browse, https://catalog.loc.gov/vwebv/searchBrowse, retrieved from the Internet Feb. 12, 2021, 1 page.
"Low-voltage Switchgear and Controlgear—Part 1: General Rules," International Standard, Amendment 2, IEC 60947-1, Edition 5.0, Sep. 2014, ISBN 978-2-8322-1798-6, pp. 1-106.
Microsemi, "Understanding 802.3at PoE Plus Standard Increases Available Power," Voltserver Exhibit 1033, Jun. 2011, pp. 1-7.
"NFPA 70: National Electrical Code," Voltserver Exhibit 1019, National Fire Protection Association, Voltserver Exhibit 1019, published Sep. 26, 2016, 2017 Edition, pp. 1-881.
"Part VII: A Summary of Commonly Used MARC 21 Fields," Marc, Understanding MARC, https://www.loc.gov/marc//Umb/um07to10.html, retrieved from Internet Feb. 13, 2021, 17 pages.
Petition for Post Grant Review of U.S. Pat. No. 10,735,105 [Public] with Exhibits, filed Feb. 16, 2021, PGR 2021-00055, pp. 1-132.
Petition for Post Grant Review of U.S. Pat. No. 10,735,105 [Public] with Exhibits, filed Feb. 16, 2021, PGR 2021-00056, pp. 1-116.
Sedra A.S., "Microelectronic Circuits," Oxford, Seventh Edition, Voltserver Exhibit 1031, Jan. 2015, Published on Nov. 14, 2014, pp. 1-38.
Stallings W., "Data and Computer Communications," Voltserver Exhibit 1028, Macmillan Publishing Company, Fourth Edition, Jan. 1994, pp. 1-14.
Tanenbaum A.S., "Computer Networks," Voltserver Exhibit 1027, Prentice Hall PTR, Third Edition, Mar. 1996, pp. 1-12.
TECHWEB: "Isolated Flyback Converter Basics: What is Switching AC-DC Conversion?", Tech Web, Overview of Design Method of PWM AC-DC Flyback Converters, Jan. 6, 2016, Retrieved on Aug. 22, 2023, pp. 1-4.
*Voltserver Inc.*, v. *Cisco Systems, Inc.*, "Patent Owner's Preliminary Response to Post Grant Review under 35 U.S.C. 312 and 37 C.F.R. 42.107," United States Patent and Trademark Office, PGR2021-00056, U.S. Pat. No. 10,735,105, 2021, Jun. 2, 2021,46 pages.
*Voltserver Inc.*, v. *Cisco Systems, Inc.*, "Patent Owners Preliminary Response to Post Grant Review under 35 U.S.C. 312 and 37 C.F.R. 42.107," United States Patent and Trademark Office, PGR2021-00055, U.S. Pat. No. 10,735,105, 2021, Jun. 2, 2021,51 pages.
*Voltserver Inc.*, V. *Cisco Technology, Inc.*, Decision Denying Institution of Post-Grant Review, United States Patent and Trademark Office, PGR2021-00055, U.S. Pat. No. 10,735,105 B2, Aug. 19, 2021, 25 Pages.

(56) References Cited

OTHER PUBLICATIONS

*Voltserver Inc.*, V. *Cisco Technology, Inc.*, Decision Denying Institution of Post-Grant Review, United States Patent and Trademark Office, PGR2021-00056, U.S. Pat. No. 10,735,105 B2, Aug. 23, 2021, 18 Pages.

*Voltserver Inc.*, V. *Cisco Technology, Inc.*, Declaration of David A. Durfee, PH.D., United States Patent and Trademark Office, PGR2021-00055, U.S. Pat. No. 10,735,105, Feb. 16, 2021, 340 Pages.

*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.

* cited by examiner

180

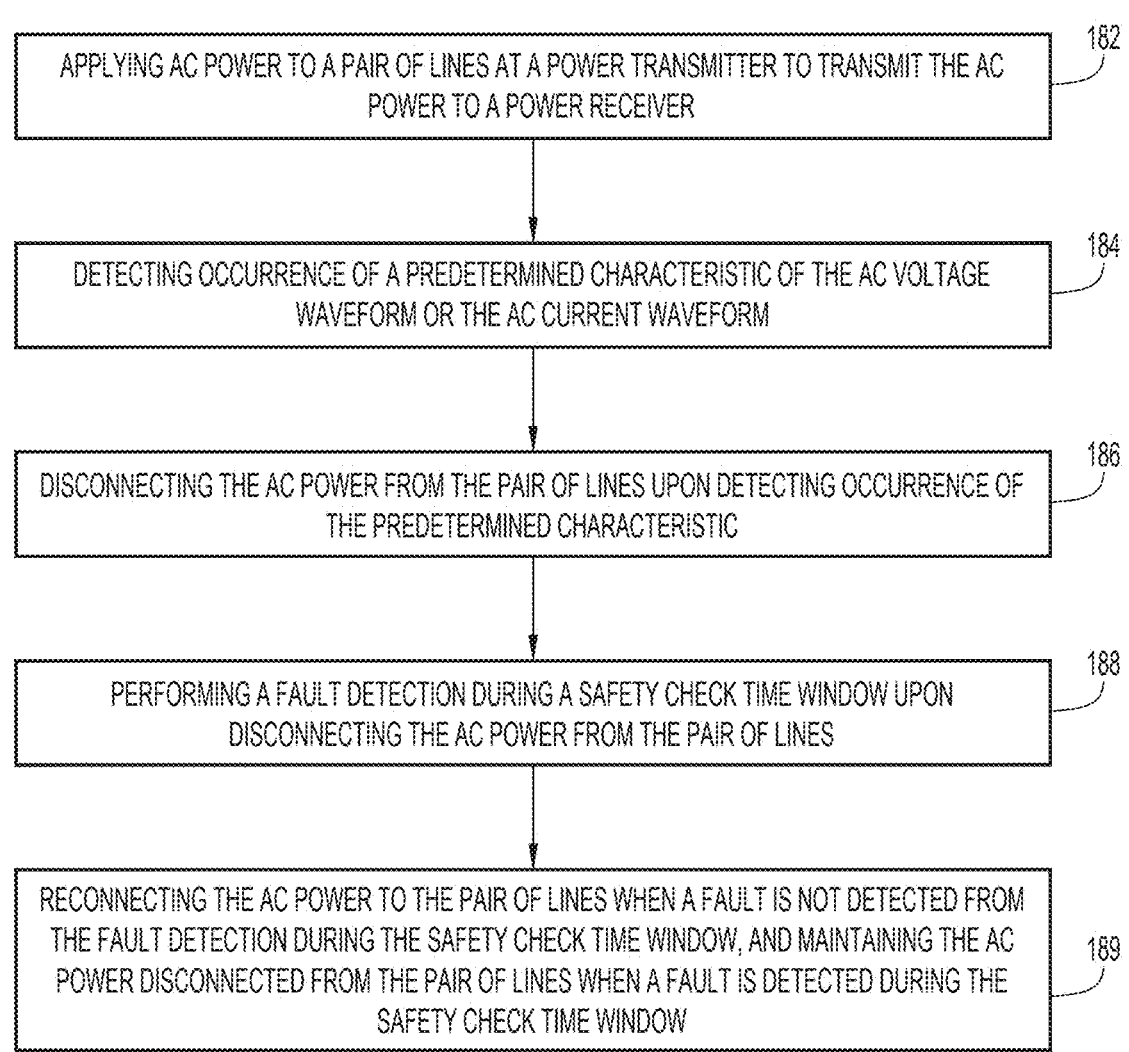

APPLYING AC POWER TO A PAIR OF LINES AT A POWER TRANSMITTER TO TRANSMIT THE AC POWER TO A POWER RECEIVER                                    182

DETECTING OCCURRENCE OF A PREDETERMINED CHARACTERISTIC OF THE AC VOLTAGE WAVEFORM OR THE AC CURRENT WAVEFORM                                184

DISCONNECTING THE AC POWER FROM THE PAIR OF LINES UPON DETECTING OCCURRENCE OF THE PREDETERMINED CHARACTERISTIC                              186

PERFORMING A FAULT DETECTION DURING A SAFETY CHECK TIME WINDOW UPON DISCONNECTING THE AC POWER FROM THE PAIR OF LINES                        188

RECONNECTING THE AC POWER TO THE PAIR OF LINES WHEN A FAULT IS NOT DETECTED FROM THE FAULT DETECTION DURING THE SAFETY CHECK TIME WINDOW, AND MAINTAINING THE AC POWER DISCONNECTED FROM THE PAIR OF LINES WHEN A FAULT IS DETECTED DURING THE SAFETY CHECK TIME WINDOW                                                                  189

FIG.1F

FAULT MANAGED POWER METHOD FOR AC POWERING SYSTEMS

CROSS REFERENCE TO RELATED APPLICATION

This application claims priority to U.S. Provisional Application No. 63/738,000, filed Dec. 23, 2024, the entirety of which is incorporated herein by reference.

TECHNICAL FIELD

The present disclosure relates to fault detection in powering systems.

BACKGROUND

Present power fault methods for alternating current (AC) powering systems rely on circuit breaker devices to trip faults or other cable protection methods to prevent humans from touching any wiring. For fault managed power systems, a set of field effect transistors (FETs) are used to shut off power briefly to allow for fault detection. These brief interruptions may result in a small power loss, depending on the point in time of fault analysis, but they allow fault detection circuitry to measure conditions on the line in order to detect any faults, and interrupt the power to prevent electrical hazards such as fire or shock to persons contacting the wire. Fault managed power fault detection circuitry will not further reduce power transfer efficiency or consume significant space. Fault managed power solutions are compact, cost effective for enterprise applications, and easily combine with digital communications.

AC powering systems are not easy to implement fault managed power-based techniques, but can offer precision current limiting, immediate overload protection, arc-fault circuit interrupter (AFCI), and ground fault circuit interrupter (GFCI) protection. AC-based circuit protection does not individually contain current awareness, voltage overstress or over-sense, or human-based fault detection.

BRIEF DESCRIPTION OF THE DRAWINGS

FIG. 1F is a flow chart depicting, at a high level, a method to determine when to perform fault detection with respect to AC power waveforms, according to an example embodiment.

DETAILED DESCRIPTION

Overview

Techniques are presented herein for AC powering methods deployed at a power transmitter and a power receiver for line fault detection. Several methods are presented herein, along with the techniques for how to create the safety check time window within which to analyze the line(s) for faults, as well as the timing to do so.

Generally, in one form, a method is provided that includes: applying alternating current (AC) power to a pair of lines at a power transmitter to transmit the AC power to a power receiver, the AC power comprising an AC voltage waveform and an AC current waveform; detecting occurrence of a predetermined characteristic of the AC voltage waveform or the AC current waveform; disconnecting the AC power from the pair of lines upon detecting occurrence of the predetermined characteristic of the AC voltage waveform or the AC current waveform; performing a fault detection during a safety check time window upon disconnecting the AC power from the pair of lines; and reconnecting the AC power to the pair of lines when a fault is not detected from the fault detection during the safety check time window, and maintaining the AC power disconnected from the pair of lines when a fault is detected during the safety check time window. The predetermined characteristic may be a crossing point of the AC voltage waveform or the AC current waveform, and the crossing point may be a zero-crossing point of the AC voltage waveform or the AC current waveform, or a root mean squared (RMS) level crossing point of the AC voltage waveform or the AC current waveform. In still another example, the predetermined characteristic is a phase offset with respect to a reference point of the AC voltage waveform or the AC current waveform.

EXAMPLE EMBODIMENTS

Presented herein are devices, systems and methods to detect a fault condition on a wire/cable carrying power when AC powering is employed, and to determine when to pulse or otherwise create a safety check time window during which a line (or lines) is/are analyzed for fault detection, and the related timing to perform such fault detection analysis. These techniques enable integration of numerous capabilities, including arc-fault circuit interrupter (AFCI), ground fault circuit interrupter (GFCI), voltage or current based fault managed power (FMP) fault, current limiting and protection, soft start and surge protection, all in a relatively small package.

Figure 1A:
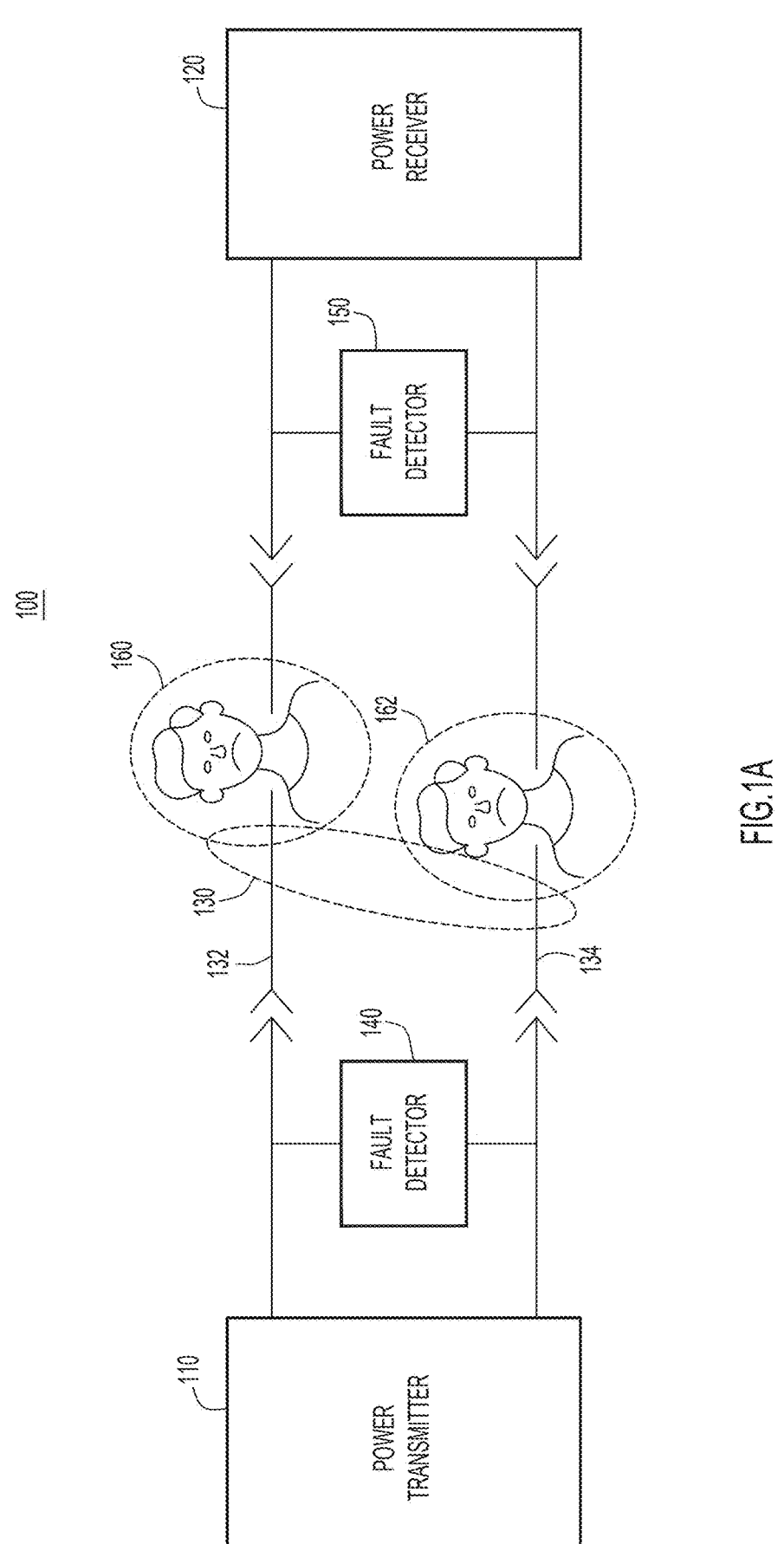
FIG. 1A is a block diagram of a power delivery system in which techniques are deployed to select when to perform fault detection with respect to AC power waveforms, according to an example embodiment.

Reference is now made to FIG. 1A, which shows a power (delivery) system 100 that includes a power transmitter 110 and a power receiver 120. In some embodiments, the power transmitter 110 may also be referred to as a power source or power source equipment and the power receiver 120 may also be referred to as a powered device. The power transmitter 110 transmits power over a cable 130 to the power receiver 120. The cable 130 may include a wire pair comprised of a send wire 132 and a return wire 134. It should be understood that the cable 130 may include multiple pairs of send/return wires, but for simplicity only a single pair is shown.

There is a fault detector 140 at the power transmitter side coupled to the send wire 132 and return wire 134, and a fault detector 150 at the power receiver side also coupled to the send wire 132 and return wire 134. The fault detectors 140 and 150 analyze signals on the wires to detect whether there is a fault on either the send wire 132 or the return wire 134.

FIG. 1A shows an example of a human 160 touching the send wire 132 and a human 162 touching the receive wire. In both instances, a fault is triggered that is detected by either the fault detector 140 or the fault detector 150, as explained in more detail below. When a fault is detected by either fault detector 140 or fault detector 150, the power transmitter 110 shuts down power completely or resets to a restart mode at a predetermined relatively low voltage. The fault detector 140 may be integrated into the power transmitter 110 and similarly the fault detector 150 may be integrated into the power receiver 120.

Figure 1B:
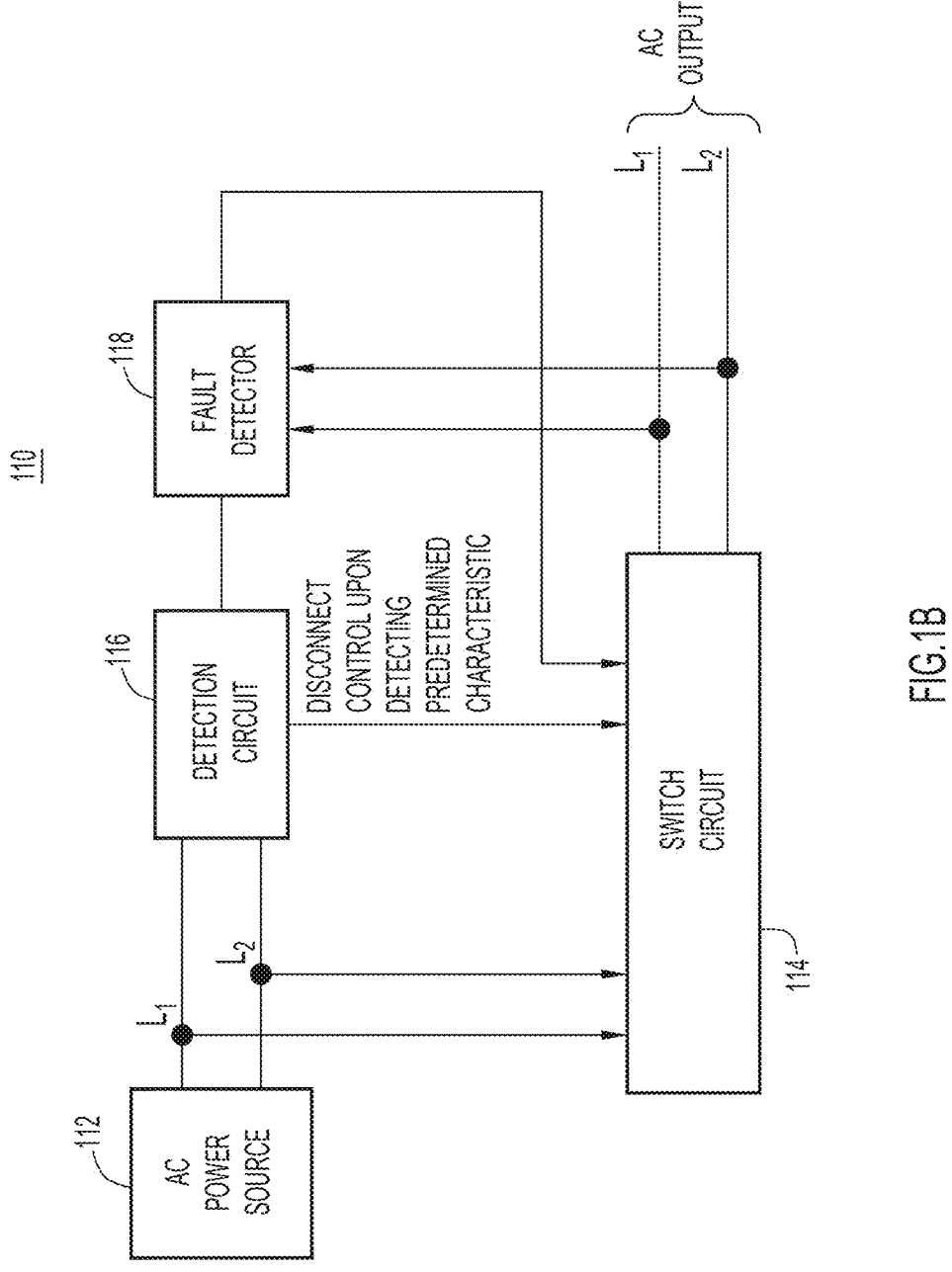
FIG. 1B is a block diagram of a power transmitter configured to coordinate the timing of fault detection with a predetermined characteristic of an AC power waveform, according to an example embodiment.
Figure 1C:
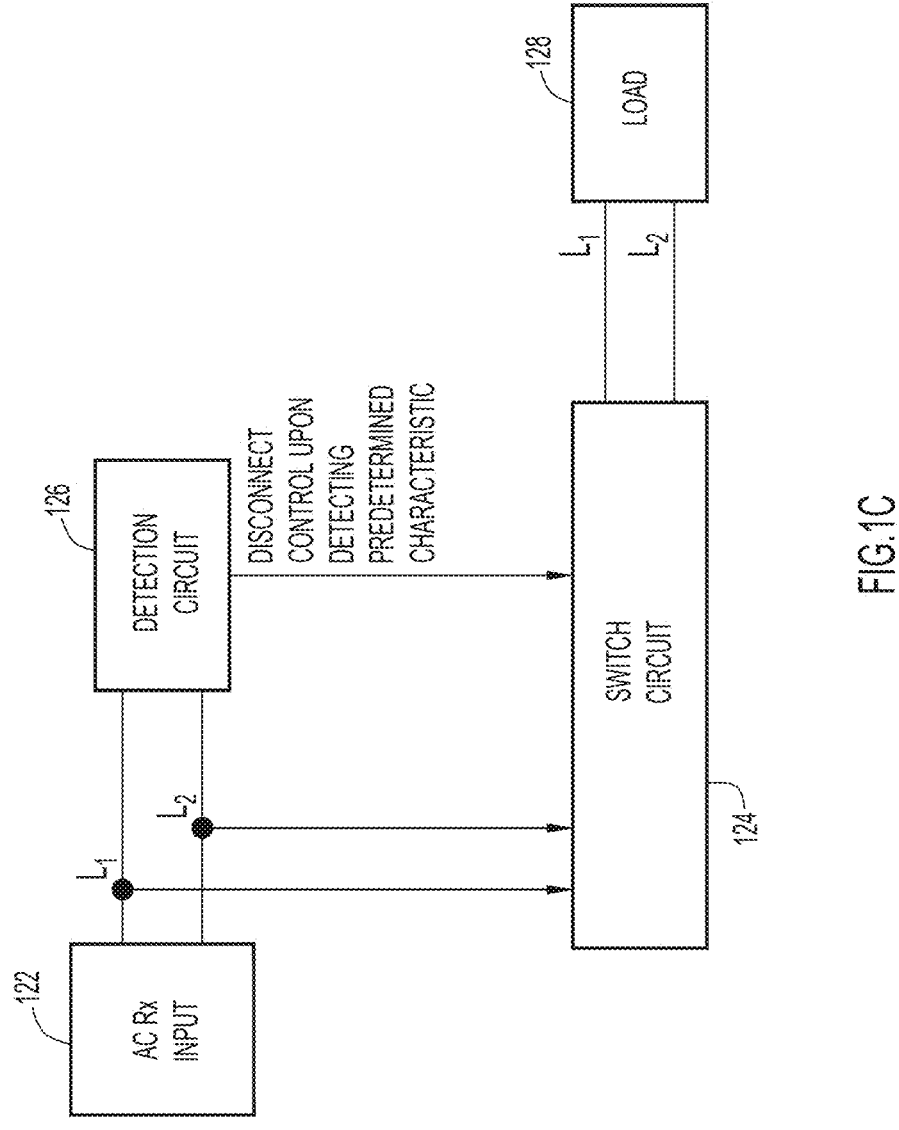
FIG. 1C is a block diagram of a power receiver configured to detect a predetermined characteristic of an AC power waveform, according to an example embodiment.

Reference is now made to FIGS. 1B and 1C for descriptions of a power transmitter and a power receiver, respectively, configured to perform the AC fault management techniques presented herein. FIG. 1B illustrates a high-level block diagram of power transmitter 110. The power transmitter 110 includes an AC power source 112, a switch circuit 114, a detection circuit 116 and a fault detector 118. The AC power source 112 provides AC power comprising an AC voltage waveform and an AC current waveform. A pair of lines L1 and L2 carry the AC power from the AC power source to an AC output, which is ultimately to be provided to a power receiver (not shown in FIG. 1B). The switch circuit 114 is connected to the pair of lines and is configured to either connect the AC power on the pair of lines to the AC output or disconnect the AC power on the pair of lines from the AC output.

The detection circuit 116 is coupled to the pair of lines L1 and L2 and to the switch circuit 114. The detection circuit 116 is configured to detect a predetermined characteristic of the AC voltage waveform or the AC current waveform and provide a control output to the switch circuit 114 to cause the switch circuit 114 to disconnect the AC power from the pair of lines for a period of time (called a safety check time window) upon detecting the predetermined characteristic. Examples of the predetermined characteristic are described below in various example embodiments.

The fault detector 118 may be a fault detection circuit that is coupled to the pair of lines L1 and L2 and is configured to perform a fault detection during a safety check time window after the switch circuit has disconnected the AC power from the pair of lines. Furthermore, the fault detector 118 is coupled to the switch circuit 114 to control the switch circuit 114 to reconnect the AC power to the pair of lines when a fault is not detected during the safety check time window, or to maintain the AC power disconnected from the pair of lines when a fault is detected during the safety check time window.

FIG. 1C illustrates a high-level block diagram of power receiver 120 that is configured to cooperate with the power transmitter in connection with the AC fault management techniques presented herein. The power receiver 120 includes an AC receive (Rx) input 122, a switch circuit 124, a detection circuit 126 and a load 128. The AC Rx input 122 receives AC power that is transmitted by a power transmitter. The switch circuit 124 is connected to the lines L1 and L2 and is configured to either connect the received AC power on the pair of lines to the load 128 or to disconnect (open circuit) the AC power from the pair of lines so that it does not reach the load 128. The detection circuit 126 is connected to the pair of lines and to the switch circuit 124. The detection circuit 126 is configured to detect the predetermined characteristic (like the power transmitter) in the AC voltage waveform or AC current waveform and provide a control output to the switch circuit 124 to cause the switch circuit 124 to disconnect the AC power from the pair of lines for a period of time upon detecting the predetermined characteristic in the AC voltage waveform or the AC current waveform. The power receiver 120 mirrors the operations of detecting the predetermined characteristic and disconnecting operations of the power transmitter but does not need to do fault detection.

Figure 1D:
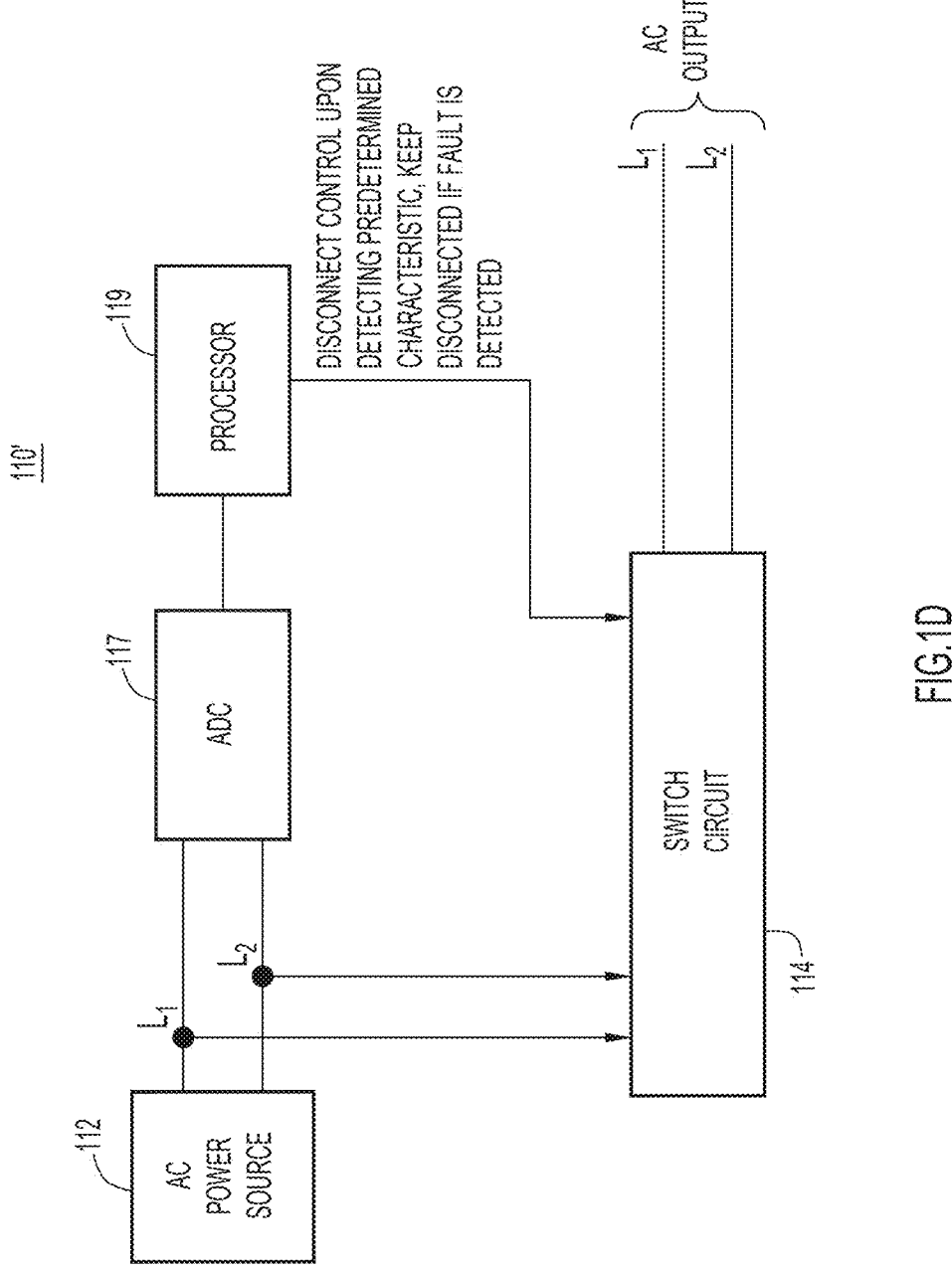
FIG. 1D is a block diagram of a power transmitter configured to use digital signal processing techniques to coordinate the timing of fault detection with respect to a predetermined characteristic of an AC power waveform, according to an example embodiment.

FIG. 1D illustrates a more digital/software-based version of a power transmitter, denoted power transmitter 110'. The power transmitter 110' includes AC power source 112, switch circuit 114, an analog-to-digital converter (ADC) 117 and a processor 119. The ADC 117 is coupled to receive or sample (through appropriate resistors) the AC voltage waveform, and the AC voltage waveform carried on the pair of lines and to convert the AC voltage waveform and the DC voltage waveform to digital measurement data. The processor 119 may be a digital signal processor (DSP), microprocessor, digital logic gates in programmable or fixed form, etc. The processor 119 is coupled to the ADC 117 and to the switch circuit 114. The processor 119 is configured to detect, based on the digital measurement data, a predetermined characteristic of the AC voltage waveform or the AC current waveform and provide a control output to the switch circuit 114 to cause the switch circuit 114 to disconnect the AC power from the pair of lines for a period of time upon detecting the predetermined characteristic. A digital-to-analog converter may be used between the output of the processor 119 and the input to the switch circuit 114. The processor 119 is also configured to perform fault detection during a safety check time window (using the digital measurement data) after the switch circuit has disconnected the AC power from the pair of lines, and control the switch circuit 114 to reconnect the AC power to the pair of lines when a fault is not detected during the safety check time window, or control the switch circuit 114 to maintain the AC power disconnected from the pair of lines when a fault is detected during the safety check time window.

Figure 1E:
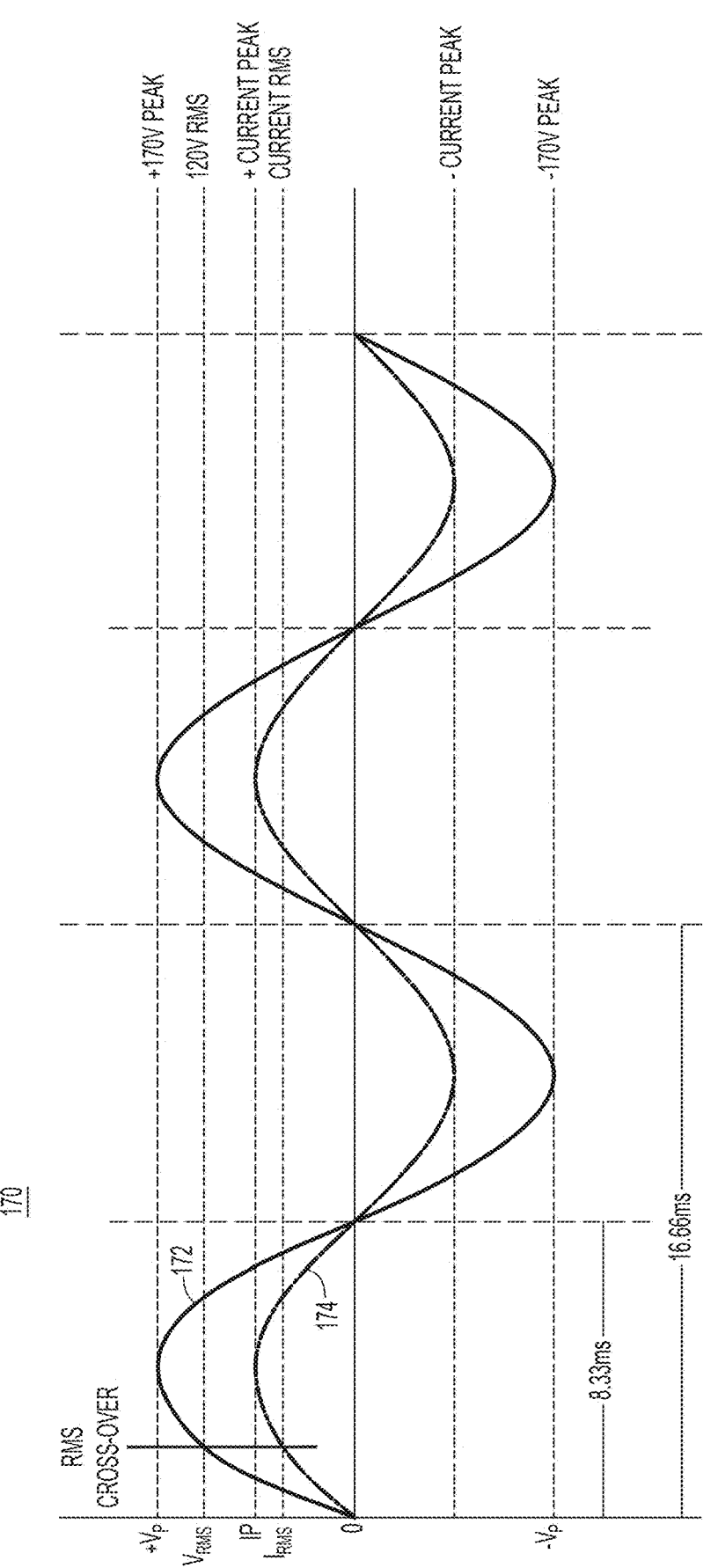
FIG. 1E is a diagram illustrating an example of an AC voltage waveform and an AC current waveform that are associated with AC power and with respect to which techniques are presented to select when to perform fault detection, according to an example embodiment.

FIG. 1E illustrates waveforms for single phase 120 V AC power 170, for standard home/office power, which includes an AC voltage waveform 172 and an AC current waveform 174. The AC voltage waveform 172 oscillates between a positive peak Vp and a negative peak-Vp and has a root mean squared (RMS) voltage of $V_{RMS}$. Similarly, the AC current waveform 174 oscillates between a positive current peak and a negative current peak, and has an RMS current of $I_{RMS}$. The waveforms for this example AC power will be referred to below in the descriptions of the various methods presented herein.

FIG. 1F is a flow chart depicting, at a high-level, a method 180 to determine when to perform fault detection with respect to AC power waveforms, according to an example embodiment. The method 180 includes, at step 182, applying AC power to a pair of lines at a power transmitter to transmit the AC power to a power receiver, the AC power comprising an AC voltage waveform and an AC current waveform. The method 180 includes, at step 184, detecting occurrence of a predetermined characteristic of the AC voltage waveform or the AC current waveform. At step 186, the method 180 includes disconnecting the AC power from the pair of lines upon detecting occurrence of the predetermined characteristic of the AC voltage waveform or the AC current waveform. At step 188, the method 180 includes performing a fault detection during a safety check time window upon disconnecting the AC power from the pair of lines. At step 189, the method 180 includes reconnecting the AC power to the pair of lines when a fault is not detected from the fault detection during the safety check time window, and maintaining the AC power disconnected from the pair of lines when a fault is detected during the safety check time window.

As is apparent from the above description and the following more detailed description, the detecting and disconnecting steps 184 and 186 are performed at the power transmitter.

Several methods are presented herein by which fault detection is initiated on the lines/wires when the power transmitter 110 is providing AC power over the lines/wires to the power receiver. These methods involve using a different predetermined characteristic that is detected to drive the timing of the safety check/fault detection. In some examples, the predetermined characteristic is a crossing point of the AC voltage waveform or the AC current waveform. For example, the crossing point is a zero-crossing point, and a first method involves timing the fault detection analysis to zero-crossings of the AC power waveform (voltage or current). In another example, the cross point is a root mean squared (RMS) level crossing point of the AC voltage waveform or AC current waveform. Thus, a second method involves timing the fault detection analysis to RMS crossing points of the AC power waveform.

In another example, the predetermined characteristic is a phase offset with respect to a reference point of the AC voltage waveform or AC current waveform. Thus, a third method involves timing the fault detection analysis according to a phase-time position/location of the current and voltage waveforms of the AC power waveform.

Method 1: Zero-Crossings of AC Power Waveform (the "Pulse-Zero Method")

Figure 2:
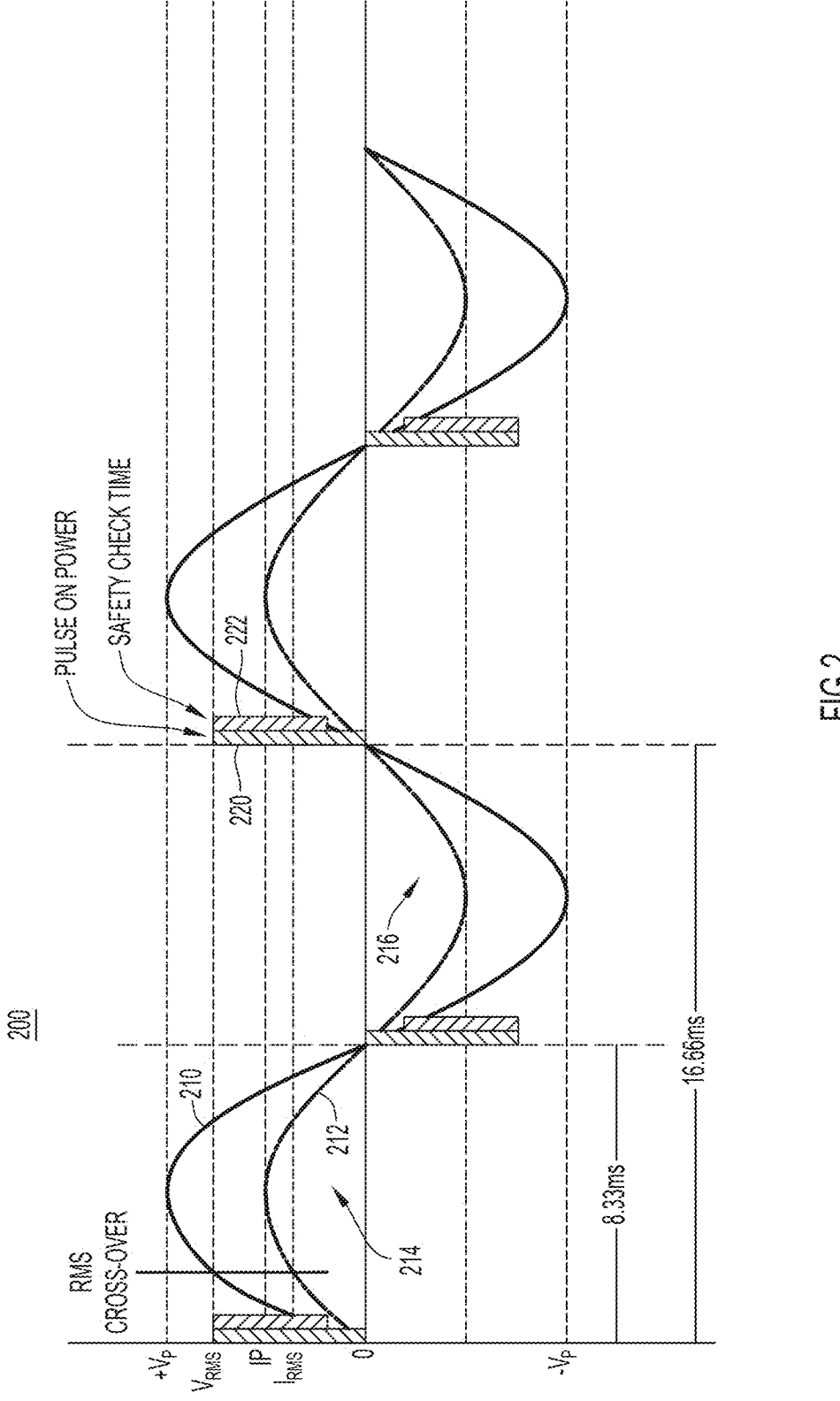
FIG. 2 is a diagram illustrating a zero-crossing method for selecting when to perform fault detection techniques with respect to AC power, according to an example embodiment.

Reference is now made to FIG. 2 for a high-level description of the first method, referred to as a zero-crossing method 200, for timing the fault detection analysis that is to be performed. The zero-crossing method is also referred to as the "Pulse-Zero" method. FIG. 2 illustrates how the pulse-zero method is applied to AC power that has an AC voltage waveform 210 and an AC current waveform 212. When the voltage and current waveforms are in phase alignment, all of the power is drawn during a time period corresponding to an area 214 under the current waveform 212 from 0 to 180 degrees (for positive current) and to an area 216 above the current waveform 212 from 180 degrees to 360 degrees (for negative current). It may be desirable, therefore, not to interrupt power at the power transmitter during these time periods in order to perform a safety check on a line. It may be more desirable to perform safety checks during time intervals when the power transmitter is not applying power, that is, at time periods around zero-crossings of an AC power waveform. The zero-crossing points are relatively easy to detect/locate at the power transmitter and at the power receiver.

Thus, as shown in FIG. 2, the AC voltage waveform 210 and AC current waveform 212 have zero-crossings at phases 0 degrees, 180 degrees and 360 degrees. The example AC power waveforms shown in FIG. 2 have a frequency of 60 Hz, so that the period is 16.66 milliseconds (ms). The zero-crossings at 0 degrees and 360 degrees are positive crossings insofar as they occur as the waveform is increasing, whereas the zero-crossing at 180 degrees is a negative crossing because the waveform is decreasing. In one example, a pulse 220 of relatively short duration (e.g., 500 microseconds (usec)) is applied to the lines after the zero-crossing. After the pulse 220 completes, the safety check time window 222 begins during which a safety check is made on the lines (based on current and/or voltage measurements on the line). Right at the zero-crossing point the lines are disconnected from the power waveform and the pulse 220 is applied to dump a voltage built up (e.g., a 50-75 V pulse) onto the lines for a period of time, and then it is removed/disconnected from the line, before initiating the safety check/fault detection during the safety check time window 222 that follows the pulse 220. The duration of the safety check time window 222 may be 500 μs, for example. Thus, during the safety check time window 222, conditions on the line (voltage and current levels) are monitored to determine if they are conditions that indicate a fault on the line(s). If a fault is detected during the safety check time window 222, then power is shut off at the power transmitter (the AC power waveform is no longer applied to the lines), and if a fault is not detected, then application of the AC power waveform is allowed to continue to be applied to the lines.

Figure 3A:
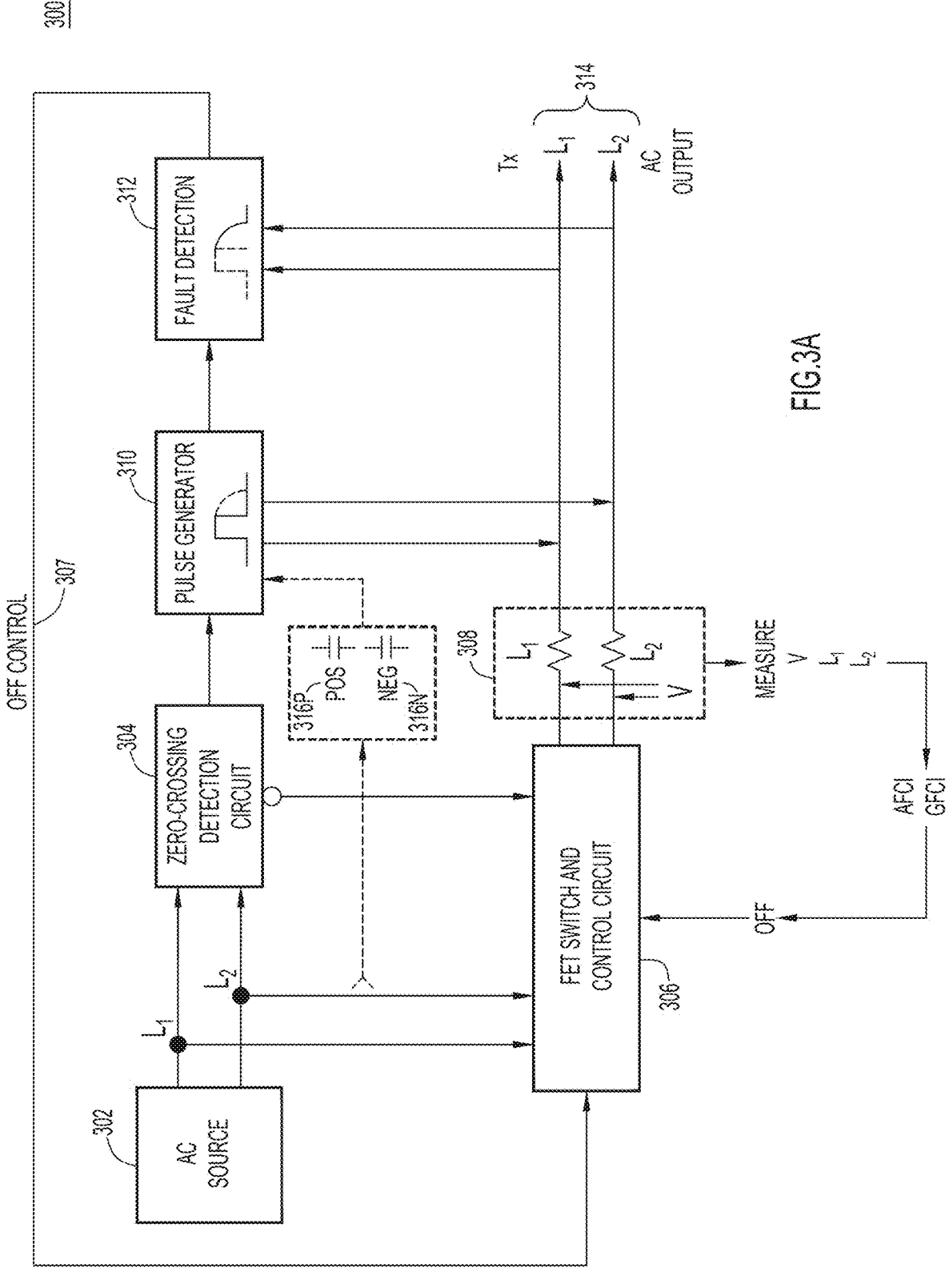
FIG. 3A is a block diagram of a power transmitter configured to perform the zero-crossing method, according to an example embodiment.

Referring now to FIG. 3A, and focusing on the power transmitter, FIG. 3A shows a block diagram of a power transmitter 300 that is configured to perform the zero-crossing method depicted in FIG. 2. The power transmitter 300 includes an AC source 302 that provides AC power to lines L1 and L2, a zero-crossing detection circuit 304 connected to lines L1 and L2, Field Effect Transistor (FET) switch and control circuit 306 connected to lines L1 and L2 and to the zero-crossing detection circuit 304, and resistance points 308 where voltage and current may be measured on lines L1 and L2. The power transmitter 300 also includes a pulse generator 310 and a fault detection circuit 312 (also referred to herein as a "fault detector"). The FET switch and control circuit 306 includes FET switches to connect/disconnect the AC power waveform to/from lines L1 and L2 with respect to the AC output 314 of the power transmitter 300 and switch control logic for the FET switches, as described in more detail below in connection with FIG. 3B. There are capacitors 316P and 316N for the positive side and negative side, respectively, through which the pulse generator 310 applies a pulse to the lines L1 and L2, respectively. The fault detection circuit 312 is coupled to the lines L1 and L2, as shown in FIG. 3A, and is also connected to the FET switch and control circuit 306 to provide an OFF control 307 to the FET switch and control circuit 306 when the fault detection circuit 312 detects a fault, causing the FET switch and control circuit 306 to disconnect AC power from the AC output. The zero-crossing detection circuit 304 could be implemented with analog circuitry or a digital signal processor (DSP) or other microprocessor that obtains data representative of the waveforms on lines L1 and L2. It should be understood also that a relay or set of relays instead of FET switches may be used to disconnect and reconnect the AC power to the pair of lines.

When the zero-crossing detection circuit 304 detects a zero-crossing of the power waveform (e.g., the AC voltage waveform), the zero-crossing detection circuit 304 triggers the FET switch and control circuit 306 to disconnect lines L1 and L2 from the AC source 302 to the AC output 314 (i.e., open circuit lines L1 and L2) so that the AC power does not flow to the AC output 314. The pulse generator 310 applies a voltage pulse onto the lines L1 and L2 via capacitors 316P and 316N, respectively, e.g., 50 V to 70 V, to charge up the lines L1 and L2, for a period of time. The fault detection circuit 312 then, during the safety check time window referred to above in connection with FIG. 2, evaluates characteristics of voltage and current on the lines L1 and L2 as a result of the pulse being applied to the lines L1 and L2 to determine whether there is a fault on the lines L1 and L2. There are numerous fault detection techniques now known or hereinafter developed that may be used during the safety check time window, but in general, such fault detection techniques look at the current and/or voltage on the lines L1 and L2 after the pulse is removed to see how current and/or voltage drop, etc., to determine whether there is a fault on the lines L1 and/or L2. Techniques for performing fault detection by observing voltage or current conditions that may be used in the various embodiments presented herein include those disclosed in commonly assigned U.S. Pat. Nos. 10,958,471; 11,683,190; 12,052,112; 11,456,883; 11,637,497; 10,735,105, 10,790,997, 11,063,630; 11,258, 520; 11,916,374; 11,923,678; and 12,061,506. If the fault detection circuit 312 detects a fault, then the FET switch and control circuit 306 controls the FET switches to stay disconnected from the lines L1 and L2 so that the AC power is not sent to the AC output 314, or a reset process is initiated. The fault detection circuit 312 may be embodied by one or more digital signal processors (DSPs) configured to perform analysis of voltage and current measurements on the lines L1 and L2.

Figure 3B:
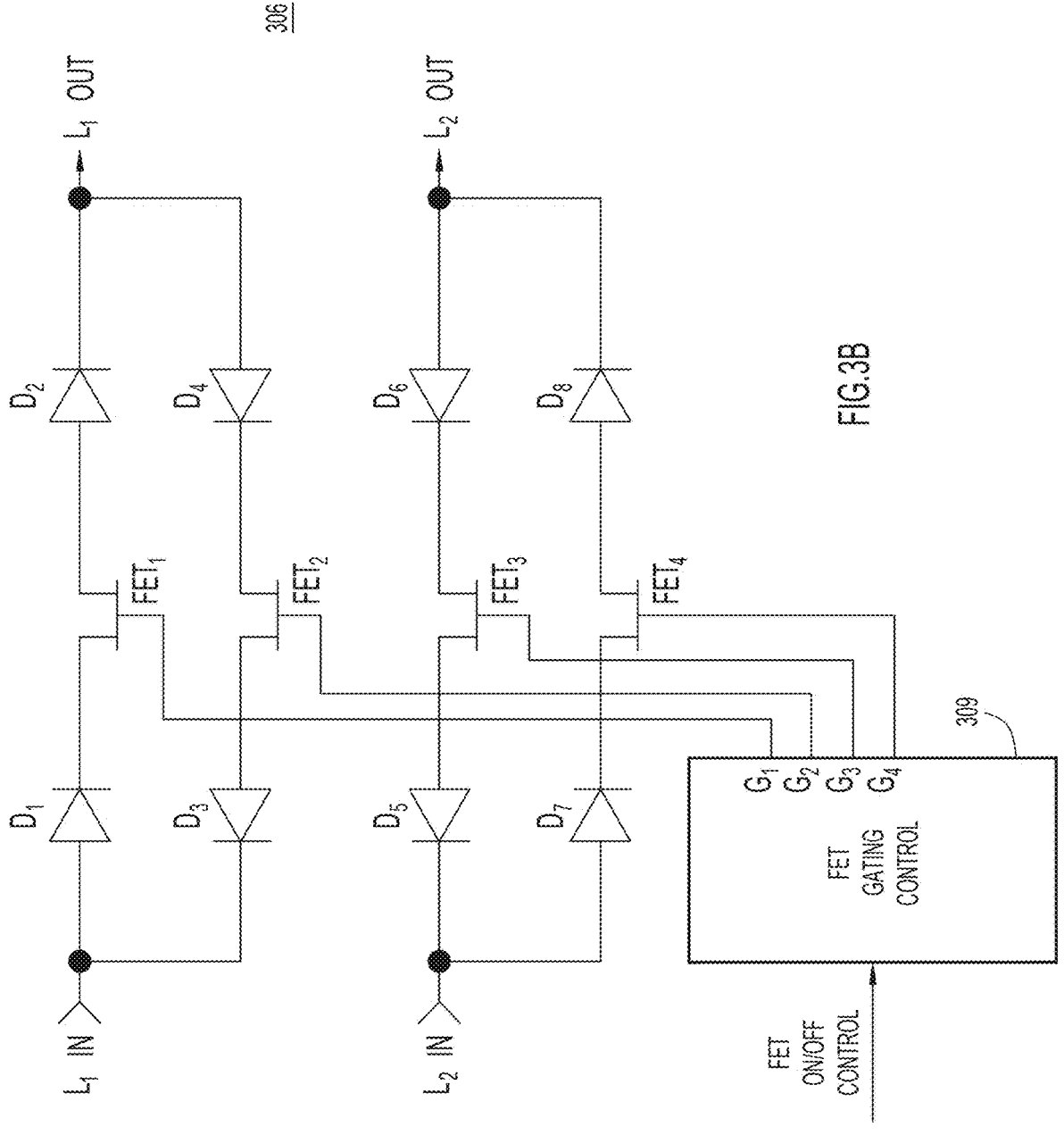
FIG. 3B is a schematic diagram of a switch and switch control circuit that is part of the power transmitter shown in FIG. 3A, according to an example embodiment.

Turning now to FIG. 3B, an example schematic diagram of the FET switch and control circuit 306 is shown, according to an example embodiment. AC-based FET circuitry is often difficult to implement because of the reverse polarity inherent in the alternating polarity of the AC waveform. The FET switch and control circuit 306 may include for each line L1 and L2, a network of diodes and FET switches to control the disconnecting and reconnecting of the respective lines L1 and L2. Specifically, connected between an input side of line L1 and an output side of line L1 there are diodes $D_1$, $D_2$, $D_3$ and $D_4$, and FETs switches $FET_1$ and $FET_2$. Similarly, connected between an input side of line L2 and an output side of line L2 there are diodes $D_5$, $D_6$, $D_7$ and $D_8$, and FET switches $FET_3$ and $FET_4$. The diode arrangement $D_1$, $D_2$, $D_5$, and $D_6$ prevents both reverse current flow and unintentional gate bias to $FET_1$ and $FET_3$ during the time in the AC cycle that $FET_2$ and $FET_4$ are biased or actively conducting current. Similarly, diodes $D_3$, $D_4$, $D_7$, and $D_8$ prevent both reverse current flow and unintentional gate bias to $FET_2$ and $FET_4$ during the time in the AC cycle that $FET_1$ and $FET_3$ are actively conducting current.

The FET switch and control circuit 306 includes FET gating control logic block 309 that outputs gating signals $G_1$, $G_2$, $G_3$ and $G_4$ that are coupled to $FET_1$, $FET_2$, $FET_3$, and $FET_4$, respectively. The FET gating control logic block 309 may be a buffer or driver and is responsive to a FET ON/OFF control from the zero-crossing detection circuit 304 (shown in FIG. 3A) as well as the fault detection circuit 312. Since $FET_2$ and $FET_4$ are connected in a reverse-manner compared to the connection arrangement of $FET_1$ and $FET_3$, the FET gating control logic block 309 could be, in one embodiment, a simple buffer/inverter where $G_1$ and $G_3$ are taken at the input to the buffer/inverter, and gating signals $G_2$ and $G_4$ are taken at the output of the buffer/inverter.

Figure 3C:
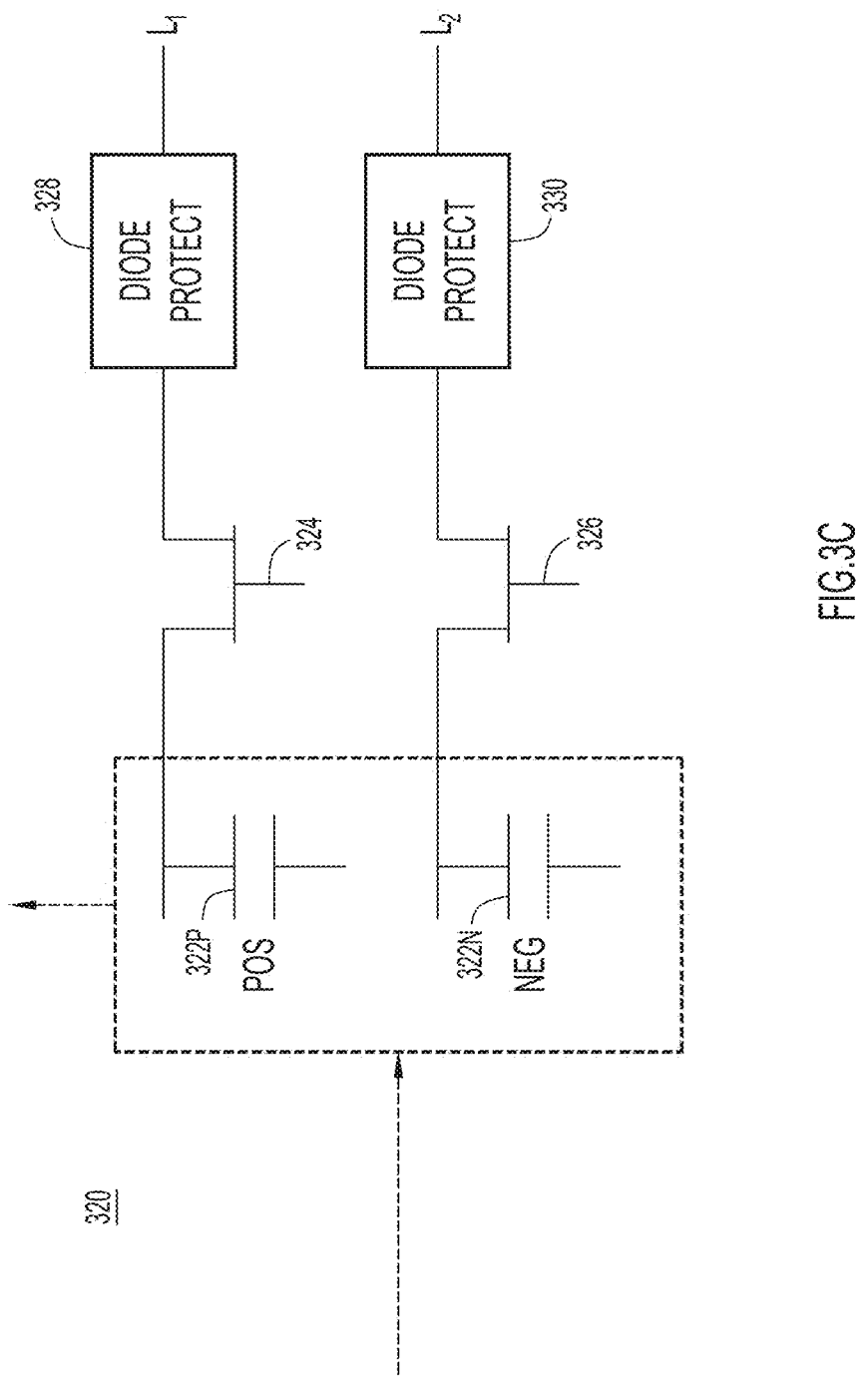
FIG. 3C is a schematic diagram of a capacitor discharge and switch control circuit that is part of a pulse generator circuit shown in FIG. 3A, according to an example embodiment.

FIG. 3C shows an example schematic diagram of a capacitor discharge and switch control circuit that is part of the pulse generator circuit shown in FIG. 3A. The capacitor discharge and switch control circuit 320 may include capacitors 322P and 322N connected to lines L1 and L2, respectively, FET switches 324 and 326, and diode protect circuits 328 and 330. The capacitors 322P and 322N can be charged up to a desired voltage and connected to the lines L1 and L2 by the FET switches 324 and 326, respectively. The diode protect circuits 328 and 330 ensure that the charge flows in one direction onto the lines L1 and L2, respectively, when the switches 324 and 326 are closed.

Figure 4:
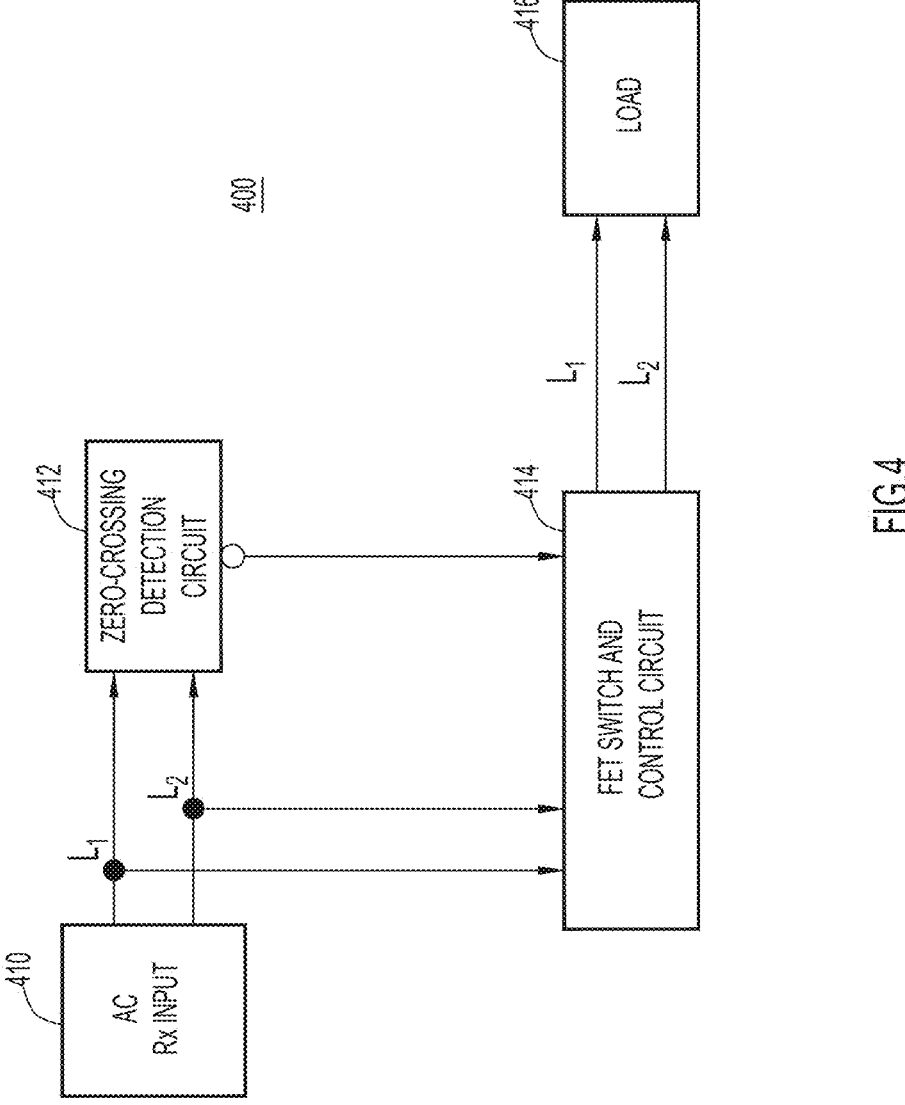
FIG. 4 is a block diagram of a power receiver configured to participate in the zero-crossing method, according to an example embodiment.

Reference is now made to FIG. 4. FIG. 4 is a block diagram of a power receiver 400 that is configured to perform receiver-side techniques for the pulse-zero method. The power receiver 400 includes an AC Rx input 410 for lines L1 and L2, a zero-crossing detection circuit 412 connected to lines L1 and L2, and a FET switch and control circuit 414 coupled between lines L1 and L2, and a load 416 that is to be powered by the power receiver 400. The zero-crossing detection circuit 412 is connected to the FET switch and control circuit 414 and is configured to detect a zero-crossing of the AC power and control the FET switch and control circuit 414 to disconnect the received AC power, at the AC Rx input 410, from the load 416. The power receiver 400 is configured to generally cooperate with the timing of power disconnect at the power transmitter so as to not drain the line when the power transmitter performs the safety check. Thus, the power receiver 400 does not include a fault detection circuit, whereas the power transmitter 300 shown in FIG. 3A does include a fault detection circuit.

In operation of the power receiver 400, the zero-crossing detection circuit 412 detects the zero-crossing of the AC power waveform(s) and provides an output signal to the FET switch and control circuit 414 to disconnect the AC Rx input 410 from lines L1 and L2 to the load 416 during the safety check time window (after the power transmitter has applied the charging pulse to the lines L1 and L2 and the charging pulse has been terminated) when the power transmitter is performing a safety check.

Figure 5A:
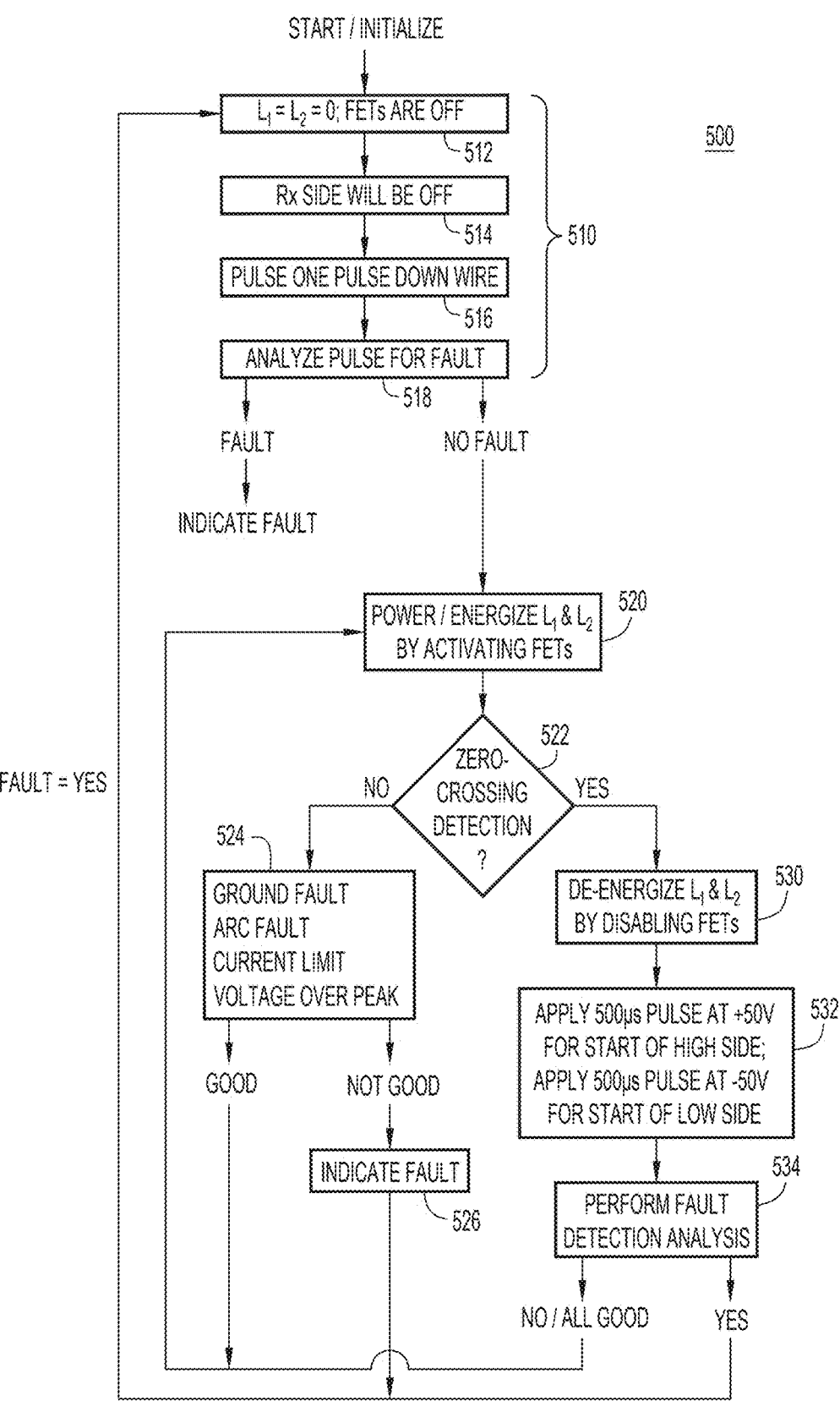
FIG. 5A is a flow diagram depicting operations performed by a power transmitter for the zero-crossing method, according to an example embodiment.
Figure 5B:
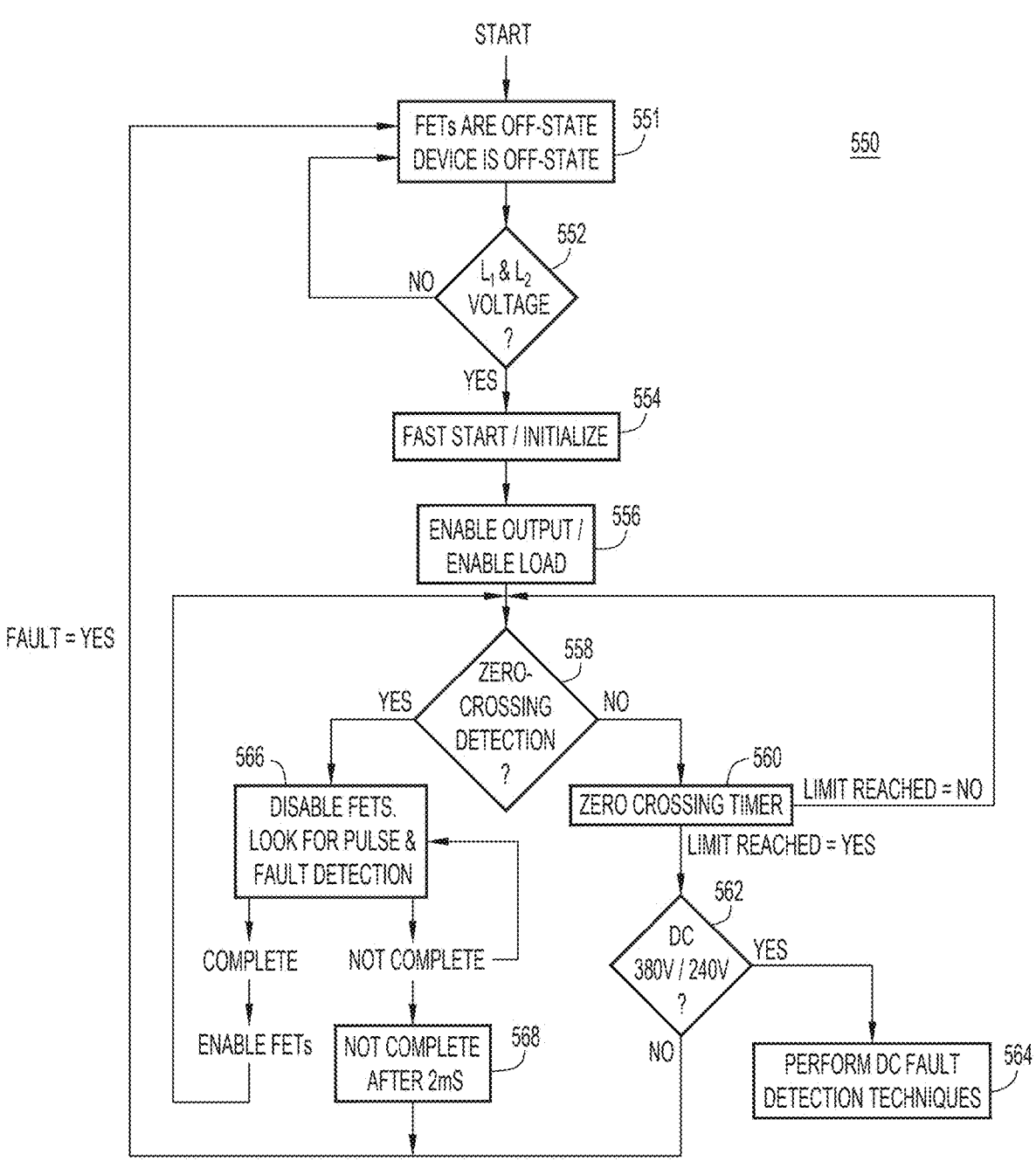
FIG. 5B is a flow diagram depicting operations performed by a power receiver for the zero-crossing method, according to an example embodiment.

Turning now to FIGS. 5A and 5B, flow/state diagrams are now described for operations of the power transmitter and power receiver, respectively, in connection with Method 1. With reference first to FIG. 5A (and reference to FIGS. 3A-3C), the flow diagram 500 for the power transmitter involves an initialization phase 510 when, before AC power is output onto the lines L1 and L2 (L1=L2=0; FETs are off) as indicated at 512 and the receive side is off as indicated at 514, at 516 an initial pulse is sent down the lines and current and/or voltage on the lines are analyzed for a fault, at 518. Again, this happens before the power transmitter outputs AC power onto the lines L1 and L2. If a fault is indicated at 518 during the initialization phase 510, then a variety of actions may be taken including alerting a technician to check the lines L1 and L2 for what may be causing a fault to remedy the issue before the initialization phase 510 is repeated. If no fault is detected during the initialization phase 510, then at step 520, AC power is applied to lines L1 and L2 by turning on (closing) the FET switches in the FET switch and control circuit 306. Next, at step 522, a zero-crossing detection determination is made and when/as long as a zero-crossing is not detected, then at 524, current and voltage on lines L1 and L2 may be analyzed for various faults, including a ground fault, arc fault, current limit or voltage over peak. When no such faults are detected then the flow returns to step 520 (or step 522). When a fault is detected at step 524, the fault is indicated at step 526 and the process may return to the initialization phase 510.

When a zero-crossing is detected at step 522, then at step 530, lines L1 and L2 are de-energized by disabling (turning OFF) the FETs in the FET switch and control circuit 306. Then, at step 532, the charging pulse is applied to the lines L1 and L2. The charging pulse may be 500 μsec in duration, for example. The pulse may be +50V when the timing is such that application of the pulse occurs when the AC power waveform is slightly above zero (positive portion of the cycle), and may be −50V when the timing is such that application of the pulse occurs when the AC power waveform is slightly below zero (negative portion of the cycle).

After the charging pulse ends, then at step 534, the safety check time window begins during which fault detection analysis on lines L1 and L2 is performed to detect a fault on the lines. The fault detection analysis may use any fault detection technique now known or hereinafter developed. When no fault is detected, then the process returns to step 520 and when a fault is detected, then the process reverts to the initialization phase 510 after the cause of the fault is remedied.

Turning now to FIG. 5B, with reference to FIG. 4, a flow diagram 550 is now described for a power receiver configured to operate in cooperation with the power transmitter for Method 1. Initially, at the power receiver, the FETs in the FET switch and control circuit 414 are in an off state, as shown at 551. When, at step 552, voltage is detected on lines L1 and L2, then at step 554, a fast start or initialization is performed, and at step 556, the FETs are turned on (closed) to enable AC output to the load. At step 558, zero-crossing detection is performed. When no zero-crossing is detected, a zero-crossing timer is started at step 560. For example, the zero-crossing timer may be 17 milliseconds (msec), which may vary depending on the frequency of the AC power. If the power receiver does not detect a zero-crossing before the zero-crossing timer times out, then at step 562, the power receiver looks for DC power on the lines, e.g., 380 V or 240 V. If such DC power is detected, then at step 564, DC fault detection techniques may be performed. If DC power is not detected on the lines, then a fault is declared because the power receiver should either detect AC power or DC power, and if neither is detected, there is a fault or issue of some sort. The process then starts over.

For as long as the zero-crossing timer has not timed out, then zero-crossing detection at step 558 is performed. When a zero-crossing is detected, then the FET switch and control circuit 414 turns off the FETs at 566, thereby disconnecting the lines from the AC input at the power receiver. At this time, the power receiver is expecting the power transmitter to perform fault detection analysis on the lines. If, by monitoring the state of the lines L1 and L2, the power receiver determines that the power transmitter did not perform a safety check after a predetermined period of time, e.g., 2 msec, then at step 568 the power receiver declares a fault and keeps the FETs of the FET switch and control circuit 414 turned off, isolating the AC inputs from the load 416. Thus, the power receiver mirrors its operations to that of the power transmitter in terms of the timing of disconnecting from the power lines, and this helps in not draining the power lines when the power transmitter performs the safety check/fault detection.

Method 2: RMS Crossing Detection ("RMS-Zero" Method)

Figure 6:
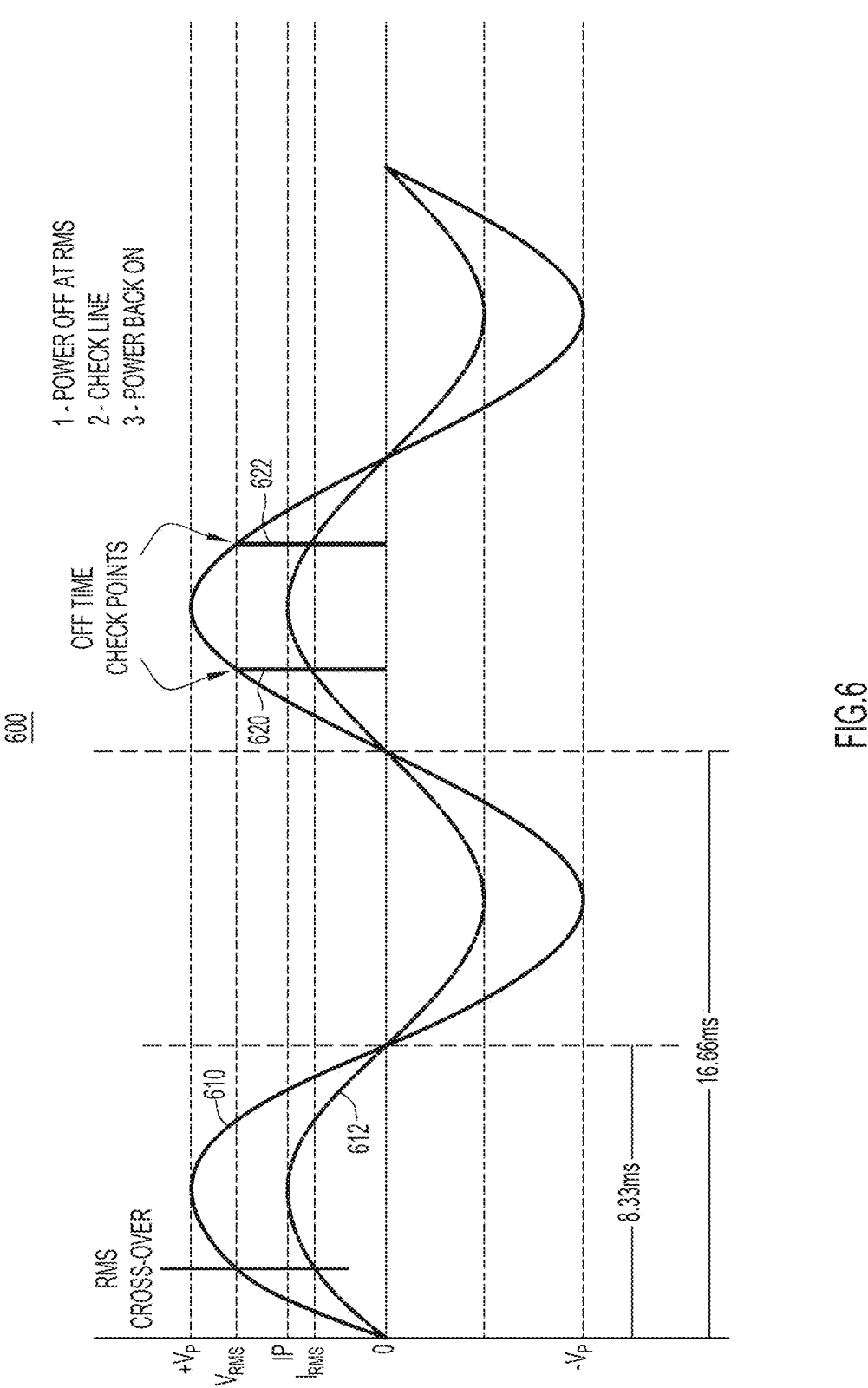
FIG. 6 is a diagram depicting a root mean squared (RMS) crossing method for selecting when to perform fault detection techniques with respect to AC power, according to an example embodiment.

Turning to FIG. 6, the second method is now described by which RMS crossing points are used to time the fault detection analysis. This method is referred to as the RMS crossing method or "RMS-Zero" method. RMS crossing points are relatively easy to detect from the AC voltage and current waveforms of the AC power. FIG. 6 shows waveforms for AC power 600, including an AC voltage waveform 610 and an AC current waveform 612. There is an RMS value for the AC voltage waveform denoted $V_{RMS}$ and an RMS value for the AC current waveform denoted $I_{RMS}$. It is possible to trigger a safety check at times that coincide with a rising side and a falling side of RMS crossing points shown at 620 and 622, respectively, which each occur twice during a full period of the AC power cycle (once during the positive part of the cycle and once during the negative part of the cycle, which is not shown in FIG. 6). Thus, there are four opportunities to trigger a safety check keyed-off of the RMS crossing of the AC voltage waveform 610 and/or AC current waveform 612, though performing a safety check at one of those crossing points may be sufficient. The RMS crossing point method enables up to four safety check opportunities during a power cycle, whereas the zero-crossing method has up to two safety check opportunities. A downside of the RMS crossing point method is that it involves doing the safety check/fault detection at a time when the AC power waveform is applying power to the lines, whereas the zero-crossing point method is performed when effectively little to no power is being applied to the lines. Thus, detecting the RMS crossing allows the power transmitter to power off at the RMS crossing, apply a pulse to the lines then perform a safety check, and reconnect power to the lines if no fault is detected during the safety check.

Figure 7A:
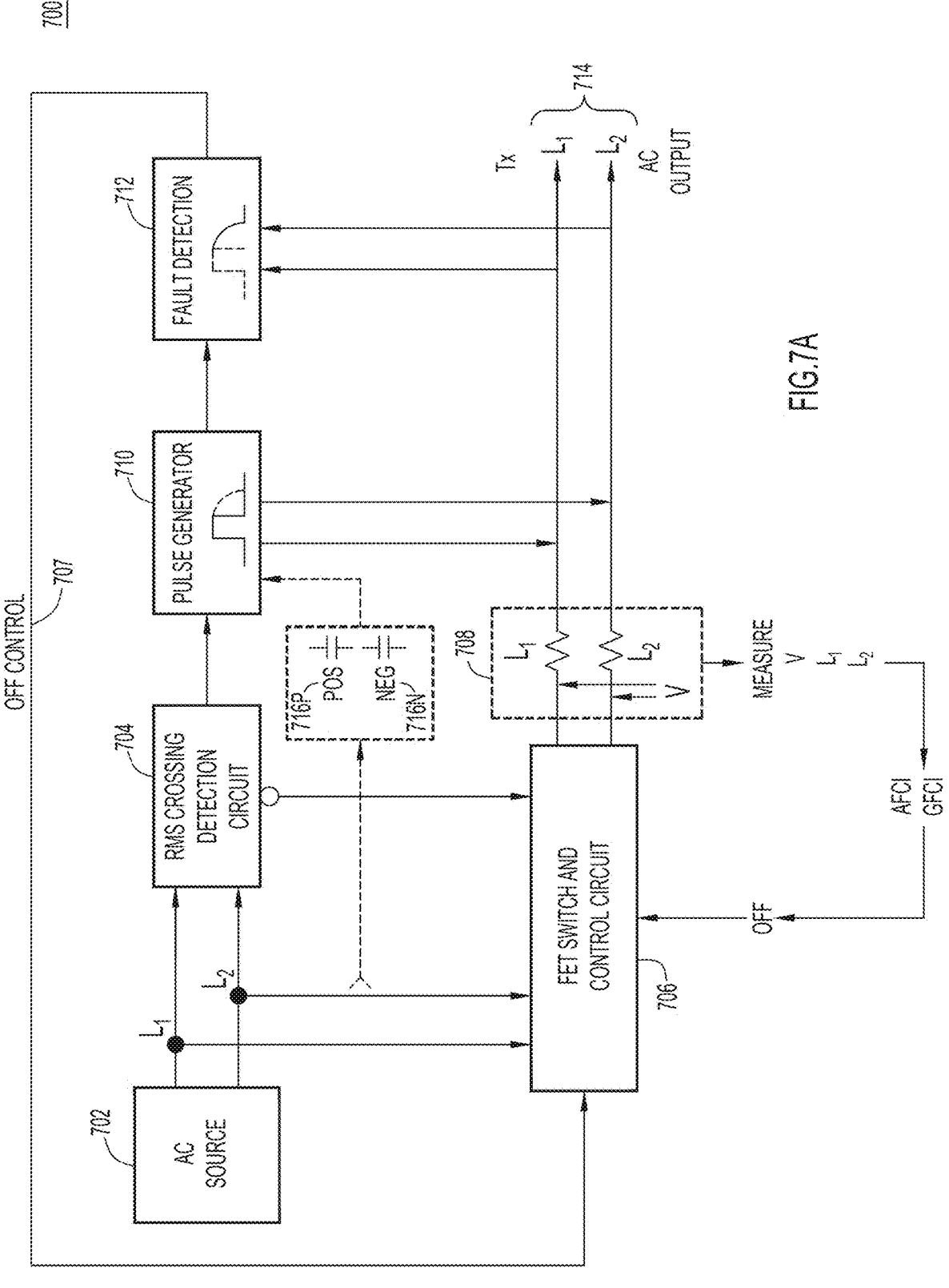
FIG. 7A is a block diagram of a power transmitter configured to perform the RMS crossing method, according to an example embodiment.
Figure 7B:
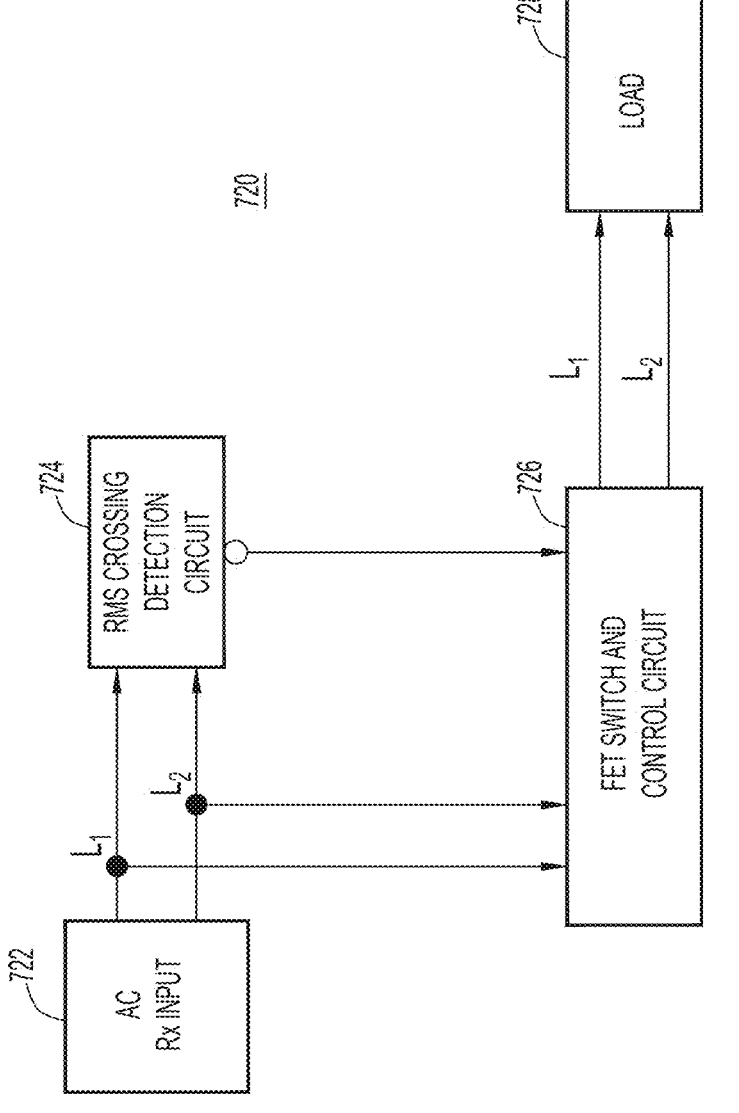
FIG. 7B is a block diagram of a power receiver configured to participate in the RMS crossing method, according to an example embodiment.

FIGS. 7A and 7B show example block diagrams of a power transmitter 700 and a power receiver 720. These diagrams are similar to the block diagrams of FIGS. 3A and 4, respectively, with the exception that an RMS crossing detection circuit replaces the zero cross detection circuit. More specifically, the power transmitter 700 includes an AC source 702 that provides AC power to lines L1 and L2, a RMS crossing detection circuit 704 connected to lines L1 and L2, FET switch and control circuit 706 connected to lines L1 and L2 and to the RMS crossing detection circuit 704, and resistance points 708 where voltage and current may be measured on lines L1 and L2. The power transmitter 700 also includes a pulse generator 710 and a fault detection circuit 712. The FET switch and control circuit 706 includes FET switches to connect/disconnect the AC power waveform to/from lines L1 and L2 with respect to the AC output 714 of the power transmitter 700 and switch control logic for the FET switches, similar to that described above in connection with FIG. 3B. There are capacitors 716P and 716N for the positive side and negative side, respectively, through which the pulse generator 710 applies a pulse to the lines L1 and L2, respectively. The fault detection circuit 712 is coupled to the lines L1 and L2, as shown in FIG. 7A, and is also connected to the FET switch and control circuit 706 to provide an OFF control 707 to the FET switch and control circuit 706 when the fault detection circuit 712 detects a fault, causing the FET switch and control circuit 706 to disconnect AC power from the AC output. The RMS crossing detection circuit 704 could be implemented with analog circuitry, a digital signal processor (DSP) or a microprocessor that obtains data representative of the waveforms on lines L1 and L2. It should be understood also that a relay or set of relays instead of FET switches may be used to disconnect and reconnect the AC power to the pair of lines.

When the RMS crossing detection circuit 704 detects a RMS crossing of the power waveform (e.g., the AC voltage waveform), the RMS crossing detection circuit 704 triggers the FET switch and control circuit 706 to disconnect lines L1 and L2 from the AC source 702 to the AC output 314 (i.e., open circuit lines L1 and L2) so that the AC power does not flow to the AC output 714. The pulse generator 710 applies a voltage pulse onto the lines L1 and L2 via capacitors 716P and 716N, respectively, e.g., 50 V to 70 V, to charge up the lines L1 and L2, for a period of time prior to fault detection being performed during the safety check time window. The fault detection circuit 712 then, during the safety check time window referred to above in connection with FIG. 6, evaluates characteristics of voltage and current on the lines L1 and L2 as a result of the pulse being applied to the lines L1 and L2 to determine whether there is a fault on the lines L1 and L2.

FIG. 7B illustrates a block diagram of a power receiver 720 that is configured to perform receiver-side techniques for the RMS-zero method. The power receiver 720 includes AC Rx input 722 for lines L1 and L2, an RMS crossing detection circuit 724 connected to lines L1 and L2, and a FET switch and control circuit 726 coupled between lines L1 and L2 and a load 728 that is to be powered by the power receiver 720. The RMS crossing detection circuit 724 is connected to the FET and switch control circuit 726 and is configured to detect an RMS crossing and control the FET switch control and circuit 726 to disconnect the received AC power, at the AC Rx input 722, from the load 728. The power receiver 720 is configured to generally cooperate with the timing of power disconnect at the power transmitter 700 so as to not drain the line when the power transmitter 700 performs the safety check.

The power transmitter 700 and power receiver 720 operate according to flow diagrams similar to those shown in FIGS. 5A and 5B, respectively, except that the zero-cross detection related operations at step 522 in FIG. 5A and at steps 558 and 560 are restated/replaced as RMS crossing detection operations.

Method 3: Phase-Time Position

Figure 8:
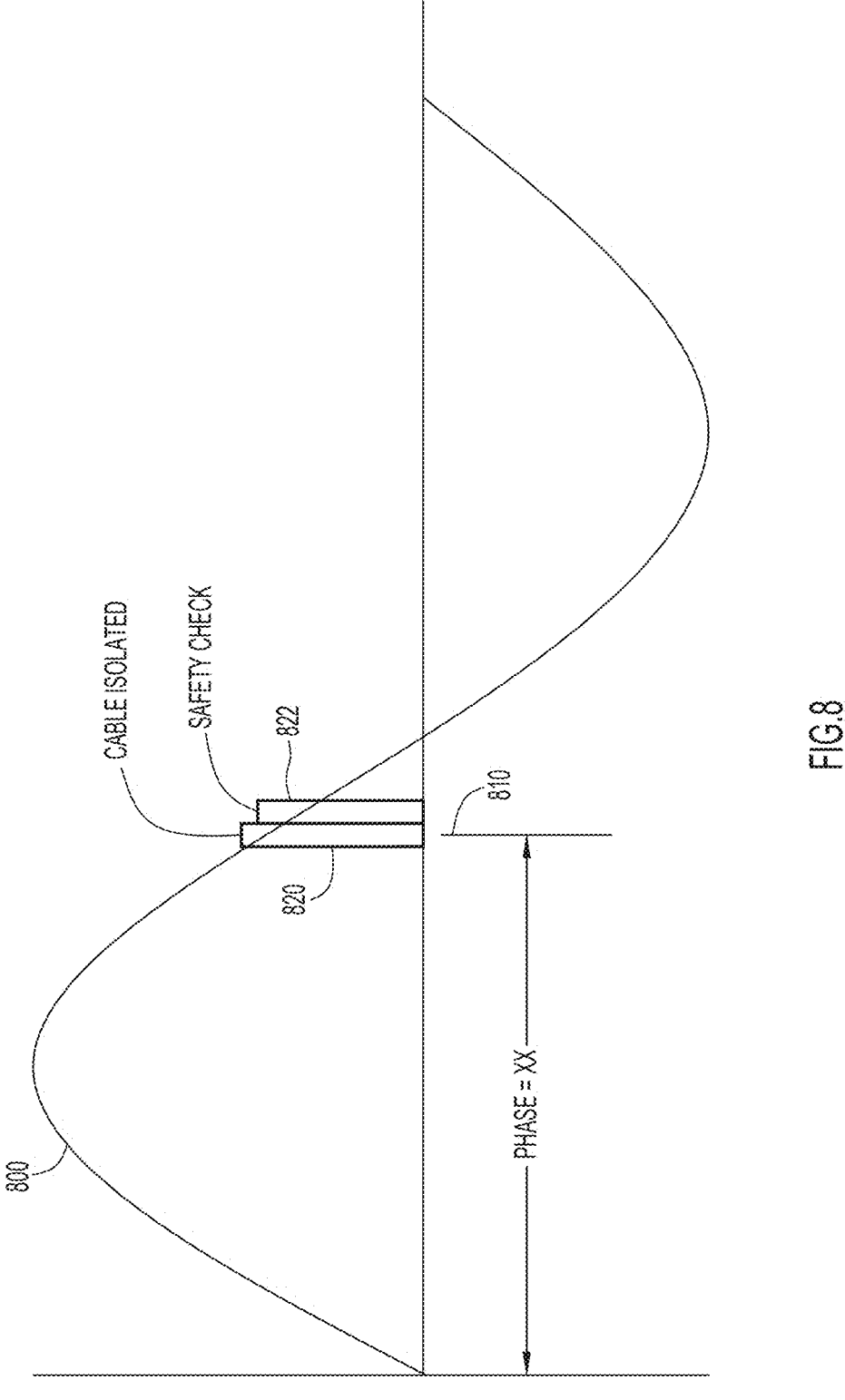
FIG. 8 is a diagram depicting a phase offset method for selecting when to perform fault detection techniques with respect to AC power, according to an example embodiment.

In this method, a desired phase relationship is used to control the timing for a safety check to be performed. FIG. 8 shows an AC power waveform (e.g., voltage waveform) 800 in which a point 810 is selected, relative to a rising zero-crossing of the waveform 800, when there is some voltage in the waveform (though it is falling at this point) such that the voltage level of the waveform is sufficient for use to create the charge pulse on the line, rather than having to generate and apply a charge pulse (as is the case for Methods 1 and 2). Thus, at 820, the lines/cable are/is isolated from the power for a period of time but there will be voltage on the line based on the level of the voltage of the waveform 800 at that time, and then at 822, the safety check time window commences during which fault detection analysis is performed.

While FIG. 8 shows that the predetermined amount of phase offset may be such that the safety check is performed during a falling part of the AC voltage waveform, this is not intended to be limiting. The timing could be anywhere during the AC power cycle. For example, it may be desirable for the power transmitter to perform the safety check at the peak of the voltage waveform, as this may be the time of highest cable/line loss so it is more efficient to clip the peak of the waveform. Moreover, the power transmitter may be able to precisely determine the time of the safety check at the peak of the voltage waveform because the power transmitter can detect that the voltage was going up and now is going down (hit a peak) and can use the derivative zero-crossing to trigger a disconnect to allow for the safety check and use a voltage threshold to determine when to trigger the reconnect (assuming no fault is detected during the safety check time window). This may be particularly desirable because it makes the power receiver timing as stateless as possible.

Figure 9A:
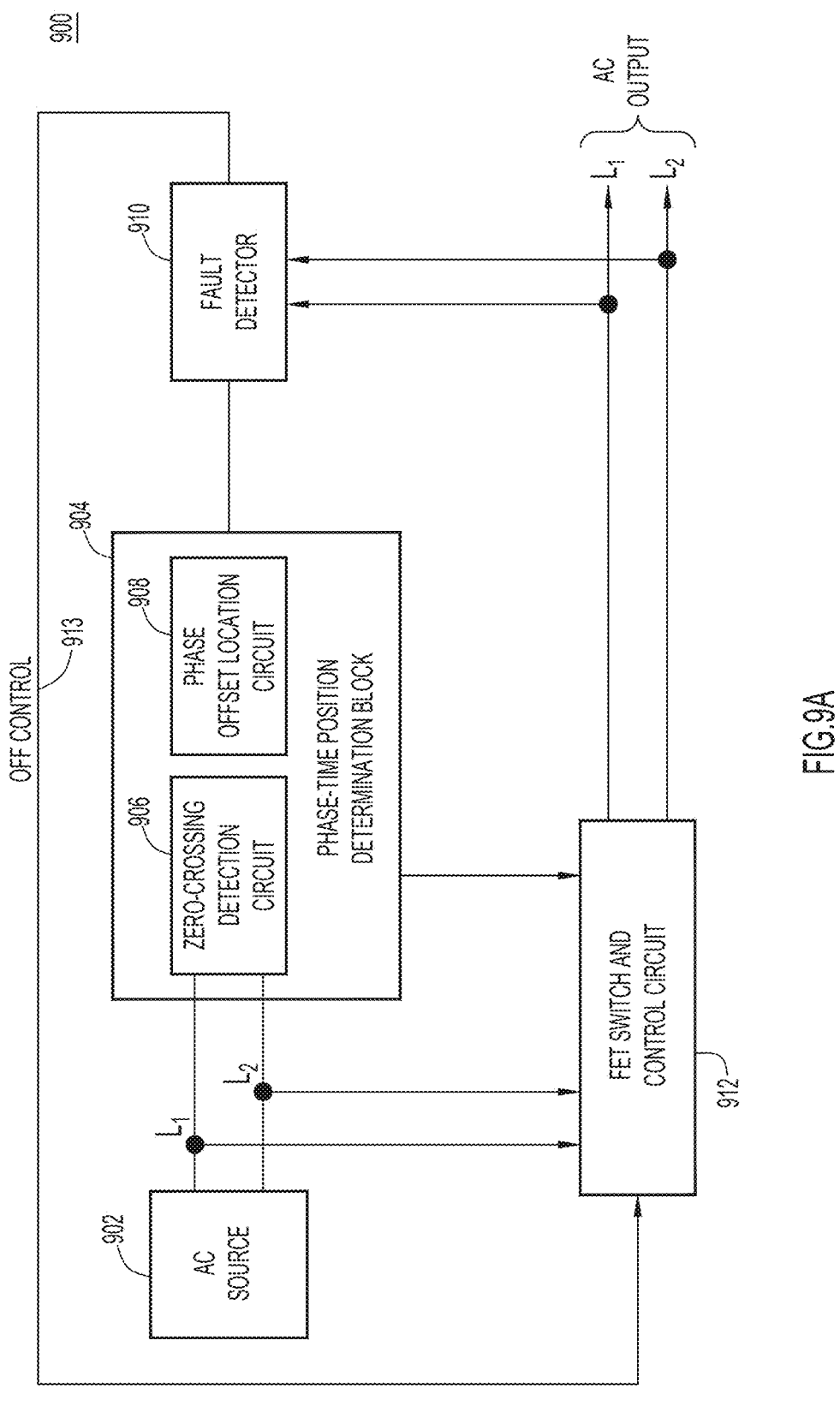
FIG. 9A is a block diagram of a power transmitter configured to perform the phase offset method, according to an example embodiment.

FIG. 9A illustrates a block diagram of a power transmitter 900 that is configured to perform the phase-time position method. The power transmitter 900 includes an AC source 902, a phase-time position determination block 904 that includes a zero-crossing detection circuit 906 and a phase offset location circuit 908, a fault detector 910 and a FET switch and control circuit 912. Notably, the power transmitter 900 does not need to include a pulse generator circuit and associated capacitors to apply a pulse to lines L1 and L2. The phase-time position determination block 904 determines the time, during an AC power waveform, when the FET switch and control circuit 912 should disconnect power from the lines L1 and L2 and provides a control to the FET switch and control circuit 912. More specifically, the zero-crossing detection circuit 906 detects a zero-crossing of the AC power waveform and that point is used as a reference for the phase offset location circuit 908 to apply a phase offset before triggering the FET switch and control circuit 912 to disconnect power from the lines L1 and L2 and for controlling the fault detector 910 to perform a safety check during the safety check time window, as described above in connection with FIG. 8. When the fault detector 910 detects a fault, it outputs an OFF control 913 to the FET switch and control circuit 912 causing the FET switch and control circuit 912 to disconnect the AC power from the AC output. An implementation of a phase offset location detection circuit uses either a delay or knowledge about an AC waveform determined by a DSP, such as in the example implementation of FIGS. 1D and 1n FIG. 13, described below.

Figure 9B:
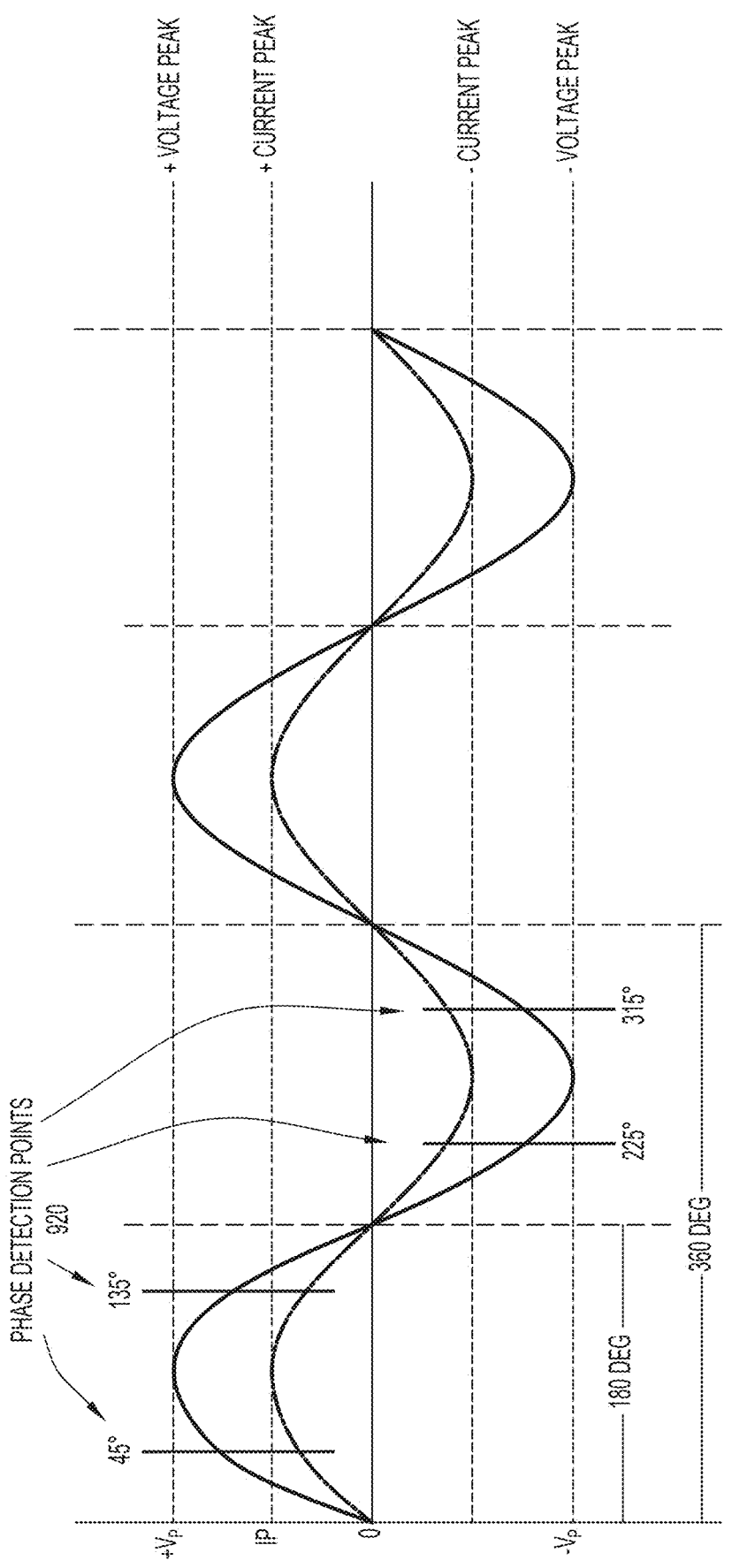
FIG. 9B is a diagram showing examples of phase detection points relative to AC voltage and current waveforms, according to an example embodiment.
Figure 13:
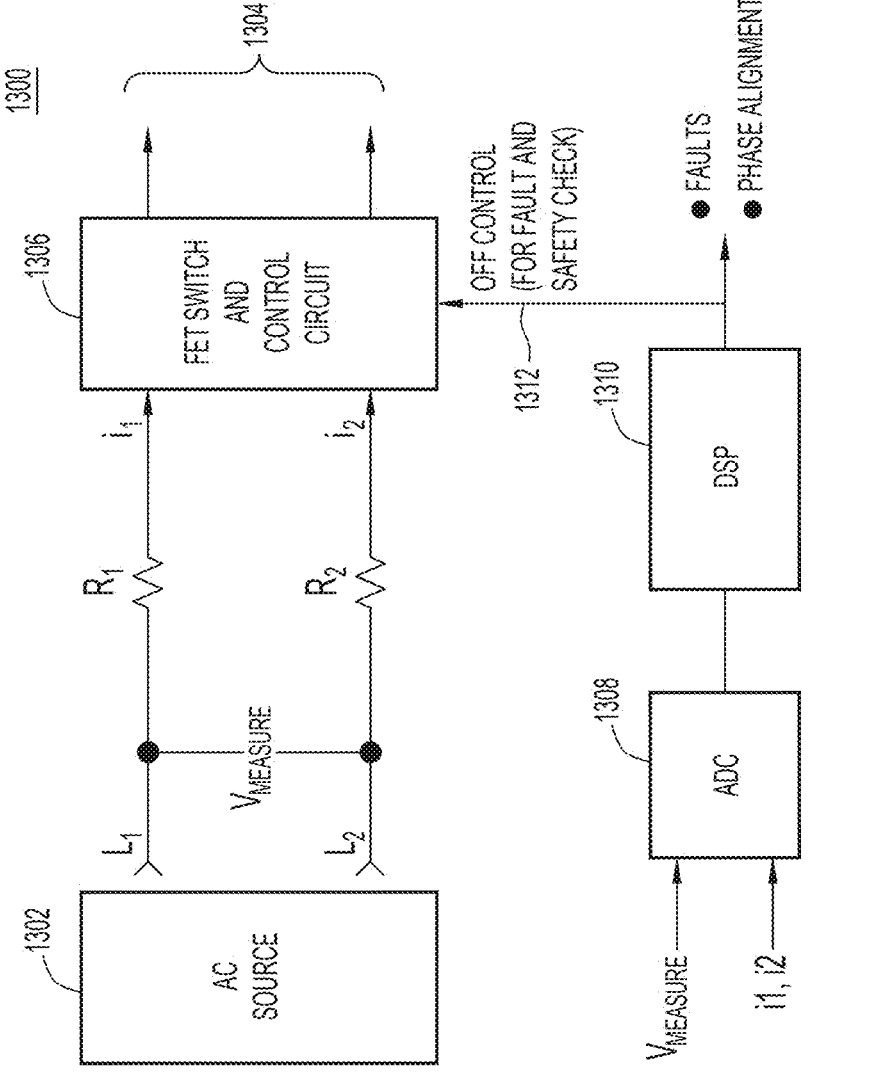
FIG. 13 is a diagram illustrating how a digital signal processor (DSP) at a power transmitter and at a power receiver may be configured to make current and voltage measurements to enable the phase offset method, according to an example embodiment.

As shown in FIG. 9B, the AC current waveform and AC voltage waveform are summarized in degrees from 0 to 360 degrees, where 0 degrees, 180 degrees, and 360 degrees may be the zero-crossing points. The phase point to be used as the fault detection point in time is then compared to the degree position in the monitored AC waveform. A fault detection is triggered whenever there is a match. Using current and voltage measurements provided to a DSP, for example as shown in FIG. 13 described below, allows for the identification of a particular point of a waveform, a zero-crossing, from which a predetermined amount of phase location (offset or delay from zero degrees or 180 degrees) can be used to set the phase location to be used as the phase detection points 920 shown in FIG. 9B for fault detection. In the example of FIG. 9B, the phase detection points are 45 degrees, 135 degrees, 225 degrees and 315 degrees. The logic flow may involve: storing information describing the waveform relative to its zero-crossings, breaking the waveform into degrees, using a selected phase detection point for comparison against the real-time AC voltage or current waveform, and applying/triggering fault detection upon a match of the selected phase detection point and its occurrence, relative to zero-crossing points, in the real-time AC voltage or current waveform.

Figure 10A:
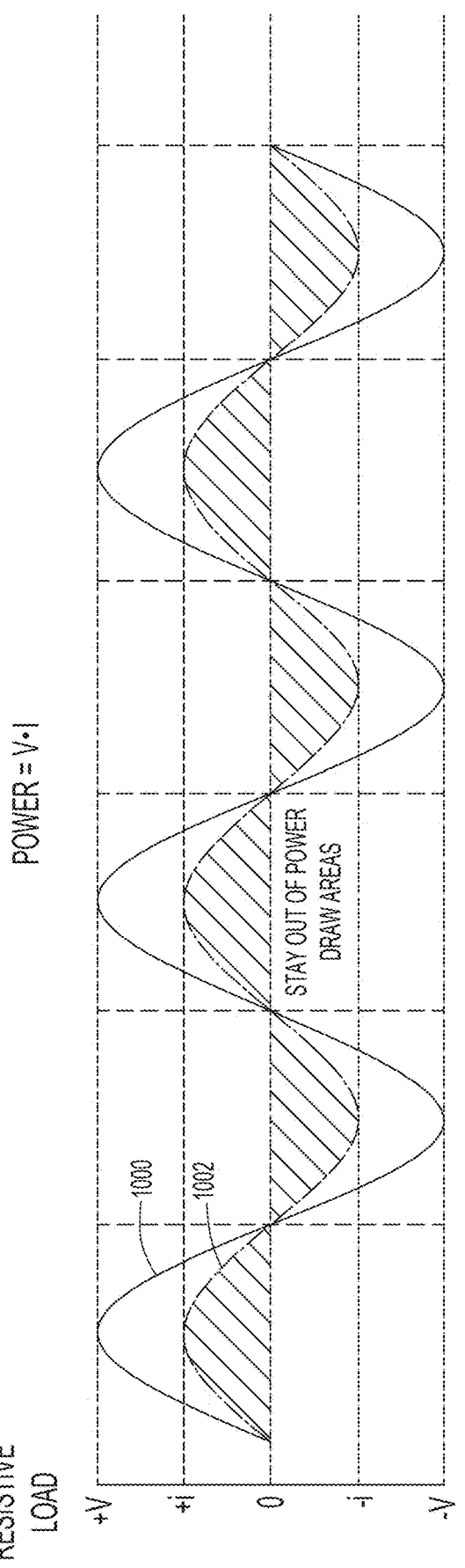
FIGS. 10A, 10B and 10C are diagrams depicting power waveforms for different types of loads, and which power waveforms are exploited to perform the phase offset method, according to an example embodiment.
Figure 10B:
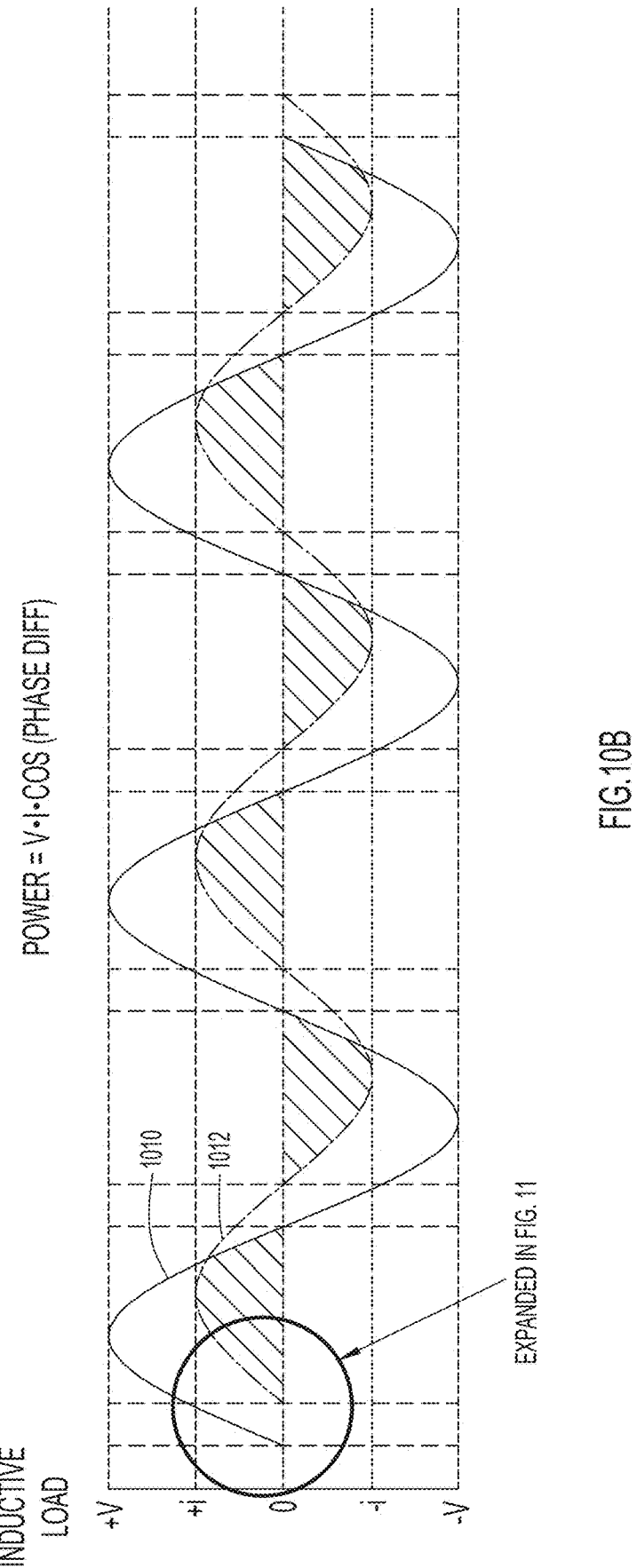
Figure 10C:
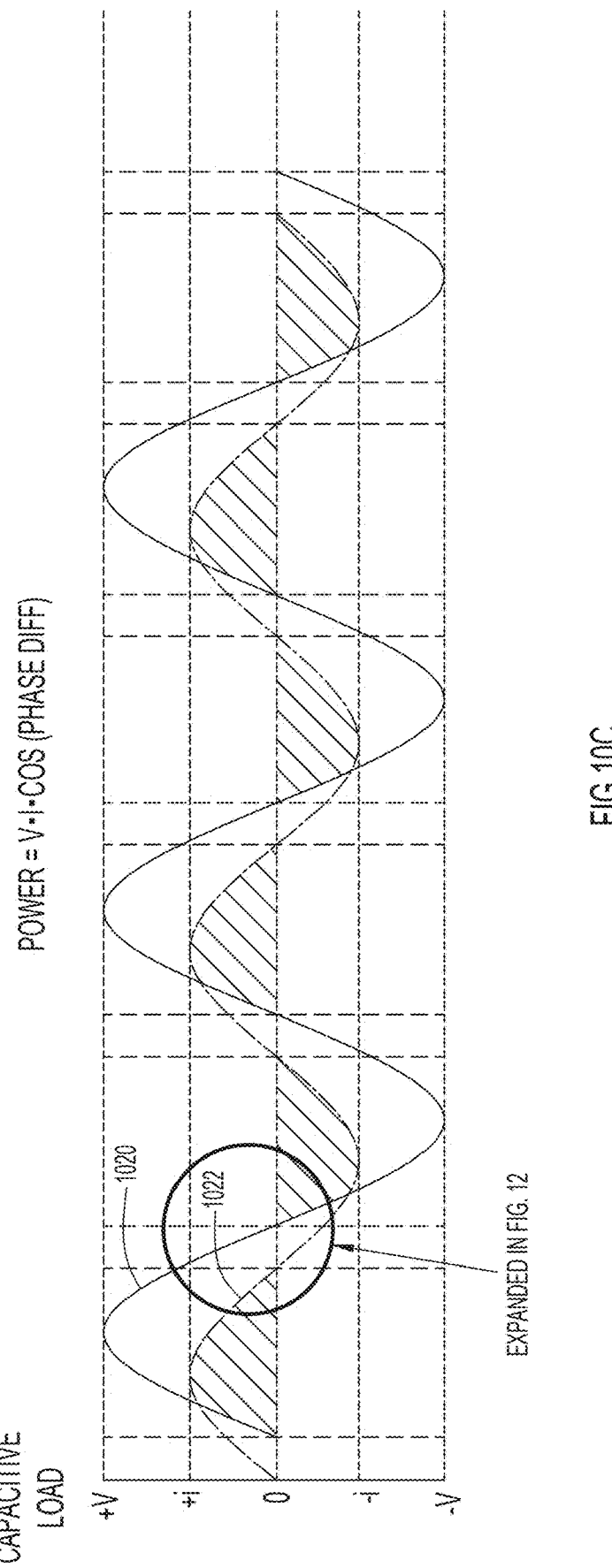

FIGS. 10A, 10B and 10C illustrate voltage and current waveforms for different load conditions. FIG. 10A illustrates waveforms for a Resistive Load, FIG. 10B illustrates waveforms for an Inductive Load and FIG. 10C illustrates waveforms for a Capacitive Load. The voltage waveform 1000 and current waveform 1002 for a Resistive Load are in phase, as shown in FIG. 10A. For an Inductive Load, the voltage waveform 1010 leads the current waveform 1012 (or said conversely, the current waveform 1012 lags the voltage waveform 1010), as shown in FIG. 10B. For a Capacitive Load, the voltage waveform 1020 lags the current waveform 1022 (or said conversely, the current waveform 1022 leads the voltage waveform 1020), as shown in FIG. 10C.

Figure 11:
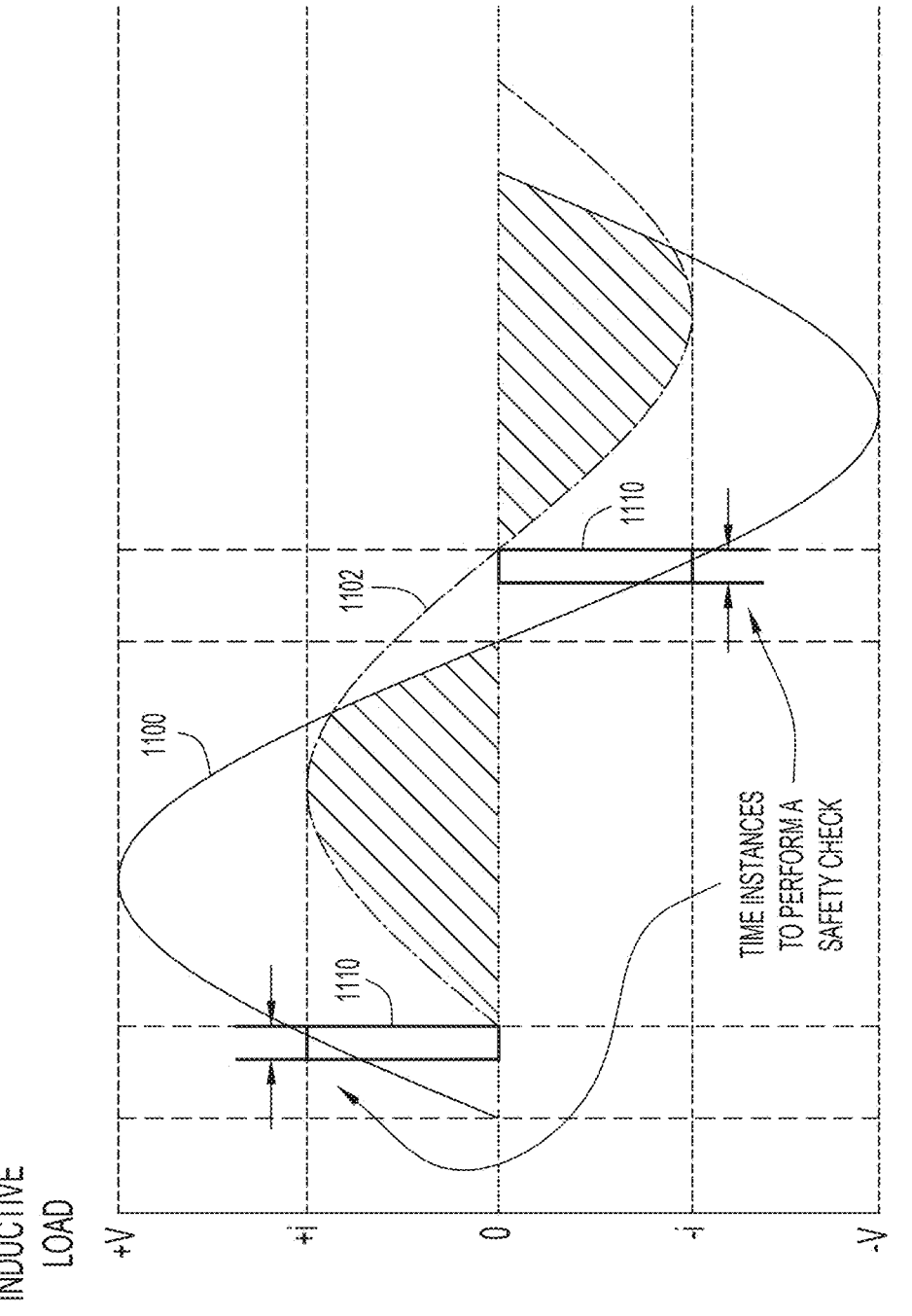
FIG. 11 is an expanded diagram of AC power waveforms in FIG. 10B and depicting a phase offset method for an inductive load, according to an example embodiment.

Reference is now made to FIG. 11. FIG. 11 shows an expanded view of a portion of a voltage waveform 1100 and a current waveform 1102 for an Inductive Load, derived from FIG. 10A as shown. Since the timing of the waveforms is known or can be determined, then a point in time can be used when the voltage gets to a certain level, the FETs are turned off, disconnecting power from the lines, and a safety check time window is initiated, shown at reference numeral 1110. The safety check time window 1110 can complete before the current turns on again (goes above or below zero). In this way, a time interval is used for the safety check when there is no or very little real power being applied but there is a voltage charged on the lines to enable a safety check by observing voltage and current conditions on the lines when they are disconnected from the AC power during the safety check time window 1110. There is no need for a time interval to apply a charge pulse to charge up the lines before the safety check time window 1110. This can be performed during the positive going portions of the waveforms or during the negative going portions of the waveform, as shown in FIG. 11. In either case, the phase offset is selected so that disconnecting AC power from the lines and performing the fault detection are performed when the AC voltage waveform is rising and reaching a peak (positive or negative), and the fault detection is completed before the AC current waveform becomes non-zero, as shown in FIG. 11.

Figure 12:
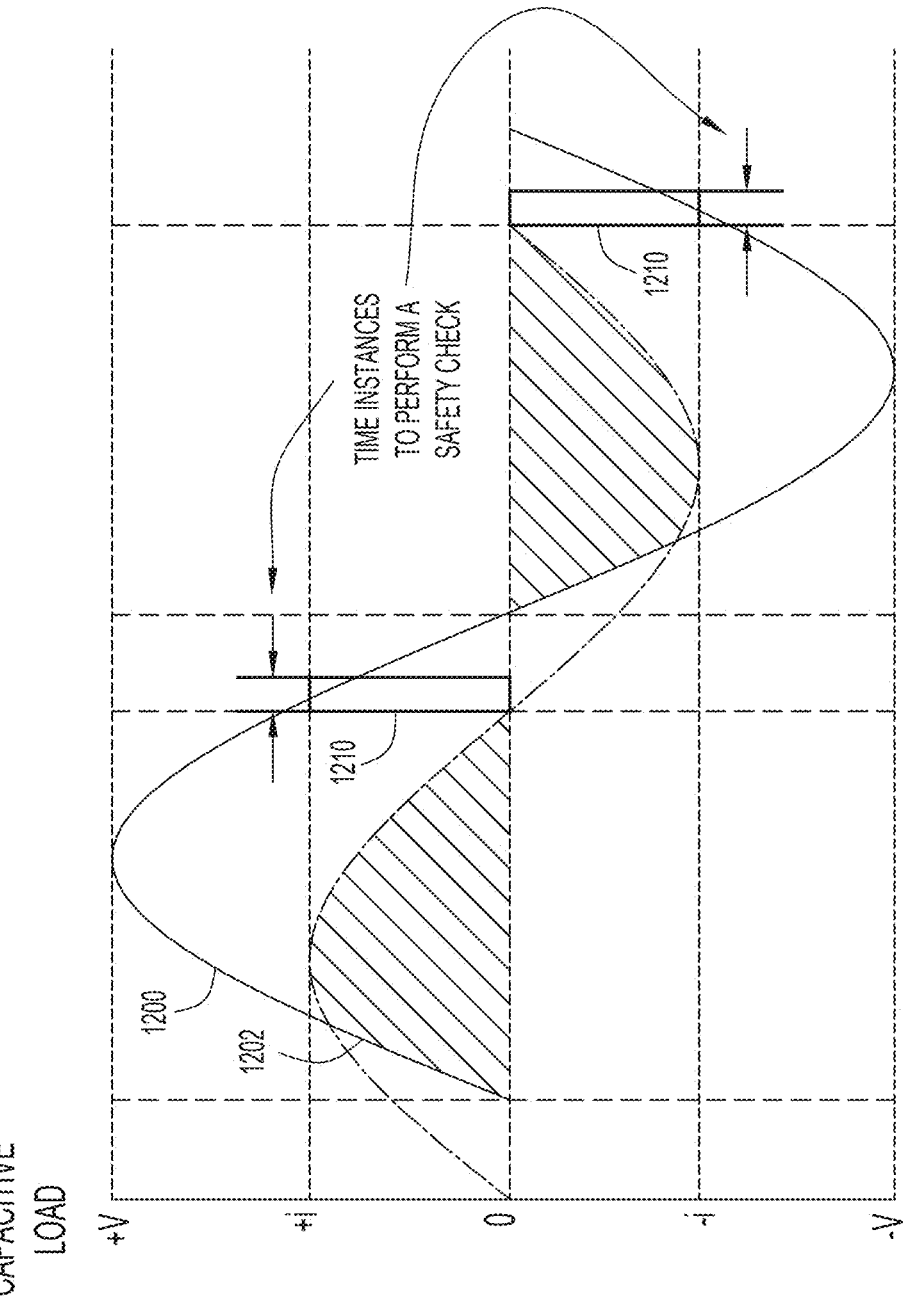
FIG. 12 is an expanded diagram of AC power waveforms in FIG. 10C and depicting a phase offset method for a capacitive load, according to an example embodiment.

FIG. 12 shows an expanded view of a portion of a voltage waveform 1200 and a current waveform 1202 for a Capacitive Load, derived from FIG. 10C. In this situation, the safety check time window should start just after the zero-crossing point of the current waveform 1202, where the voltage is at or near a maximum, and initiate a safety check time window 1210 since the lines are already charged by the voltage waveform, and there is no or very little current being applied to the lines. This can be performed during the positive going portions of the waveforms or during the negative going portions of the waveform, as shown in FIG. 12. Thus, FIG. 12 shows an example in which the phase offset is selected so that disconnecting AC power and performing the fault detection are performed when the AC voltage waveform is falling from a peak and the AC current waveform crosses zero, or just after the AC current waveform crosses zero.

FIG. 13 illustrates an example configuration to use a digital signal processor (DSP) or other processing device, such as a microprocessor, at the power transmitter and/or power receiver, to derive from current and voltage measurements taken from the lines the phase relationship between the voltage waveform and the current waveform for AC power over the lines. Specifically, a power transmitter 1300 is shown that includes an AC source 1302, lines $L_1$ and $L_2$ that carry the AC power waveforms, including the current $i_1$ and $i_2$ to a power transmitter AC output 1304 via a FET switch and control circuit 1306. Voltages across resistors R1 and R2, connected in lines $L_1$ and $L_2$, respectively, are measured, to derive a measure of the AC current $i_1$ and $i_2$, and the AC voltage (denoted $V_{measure}$) between lines $L_1$ and $L_2$. $V_{measure}$ is the AC voltage waveform. These analog signals for $i_1$, $i_2$ and $V_{measure}$ are coupled to an analog-to-digital converter (ADC) 1308 to convert them to digital signals (digital samples) for analysis by a DSP 1310. A similar arrangement can be used in a power receiver.

The DSP 1310 can be programmed to detect the zero-crossing points of the AC current and voltage waveforms from $i_1$, $i_2$ and $V_{measure}$. From the knowledge about the zero-crossing points, the DSP can determine how current is leading and lagging to select the point where voltage is at a highest while current is ineffective at either side of its zero-crossing point (the side where real power is zero or very small). The DSP 1310 can provide OFF control 1312 upon the zero-crossing detections. This achieves synchronization between the power transmitter and the power receiver, and thus enables the DSP 1310 to precisely determine the time instances when to start a safety check time window for the scenarios shown in FIGS. 11 and 12. Thus, the power receiver can align to the same points that the power transmitter uses for safety check so that the power receiver can verify proper operation by the power transmitter, as described above. The DSP 1310 (at both the power transmitter and power receiver) is always monitoring voltage and current and selecting the desired check point. The DSP 1310 could continuously update the selection points based on the measurements it makes. The DSP 1310 could use the lead/lag effect to detect the zero-crossing points and then, for a resistive load, a method is performed where a particular desired phase offset from a zero-crossing point is used, as shown in FIG. 8.

Thus, the DSP 1310 may be used for several fault detection related operations:

1. If $V_{measure}$>266 V AC or 420 V DC (or some other threshold), that is an over voltage fault/alert.
2. If $i_1$ is not equal to $i_2$ during one AC cycle (360 degrees), that is a GFCI fault.
3. If $V_{measure}$ is equal to a high frequency peak, that is an arc fault.
4. If $i_1$> "xx" amps or $i_2$> "xx" amps, that is a circuit over current fault/alert.
5. Generate crossing points: zero-crossing (2 per 360-degree cycle), RMS crossings (4 per 360-degree cycle), predetermined phase offset from a crossing point.

In a power transmitter, when the DSP 1310 detects a fault, it outputs OFF control 1312 to the FET switch and control circuit 1306 to cause the FET switch and control circuit 1306 to disconnect AC power from the AC output 1304.

Certain measurement point decisions in AC power waveforms may be better depending on the time of fault detection method being employed during the safety check time interval. For example, when doing a voltage-based fault detection, a desired time to perform the check is when the voltage is non-zero but the current is zero. Conversely, when doing a current-based fault detection, a desired time to perform the check is when the current is as close to zero as possible, but the level of the voltage is not a concern.

Forcing Lead/Lag to Facilitate Safety Check

The lead/lag effect of AC power waveforms may be exploited to force the lead/lag effect to make a safety check easier or to enable a desired type of safety check. Such power factor correction methods may be employed specifically to induce a desired safety check modality. To this end, reference is now made to FIGS. 14A, 14B and 14C.

Figure 14A:
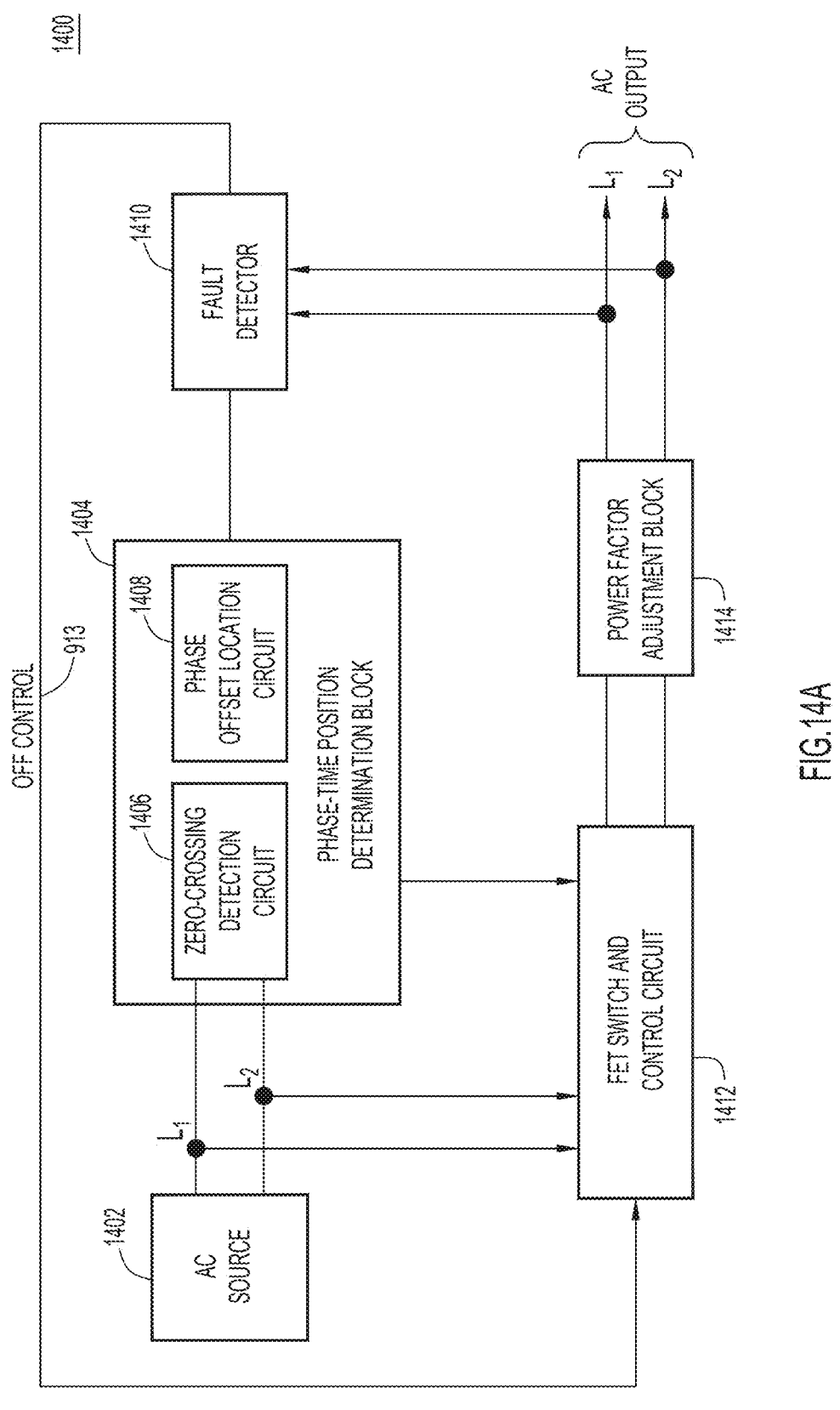
FIGS. 14A and 14B are block diagrams of a power transmitter and a power receiver, respectively, configured to adjust a power factor to enable the phase offset method, according to an example embodiment.

FIG. 14A is a block diagram of a power transmitter 1400 that is similar to the power transmitter 900 shown in FIG. 9A but is further configured to force or induce an amount of phase shift of lead/lag between the AC current waveform and AC voltage waveform. The power transmitter 1400 includes an AC source 1402, a phase-time position determination block 1404 that includes a zero-crossing detection circuit 1406 and a phase offset location circuit 1408, a fault detector 1410 and a FET switch and control circuit 1412. These components are similar to those of the power transmitter 900 shown in FIG. 9A and described above.

However, the power transmitter 1400 further includes a power factor adjustment block 1414 to force or induce an amount of phase shift or lead/lag. In one example, the power factor adjustment block 1414 may be a bank of one or more capacitors connected in parallel or one or more inductors connected in series. The power factor adjustment block 1414 may be connected between the FET switch and control circuit 1412 and the AC output or integrated into the output side of the FET switch and control circuit 1412. Moreover, the power factor adjustment block 1414 may include a plurality of capacitors connected in parallel, and connected in a switched arrangement such that one or more capacitors may be switched in/out of the path of power on the lines to adjust the amount of capacitance induced on the AC power waveforms.

Figure 14B:
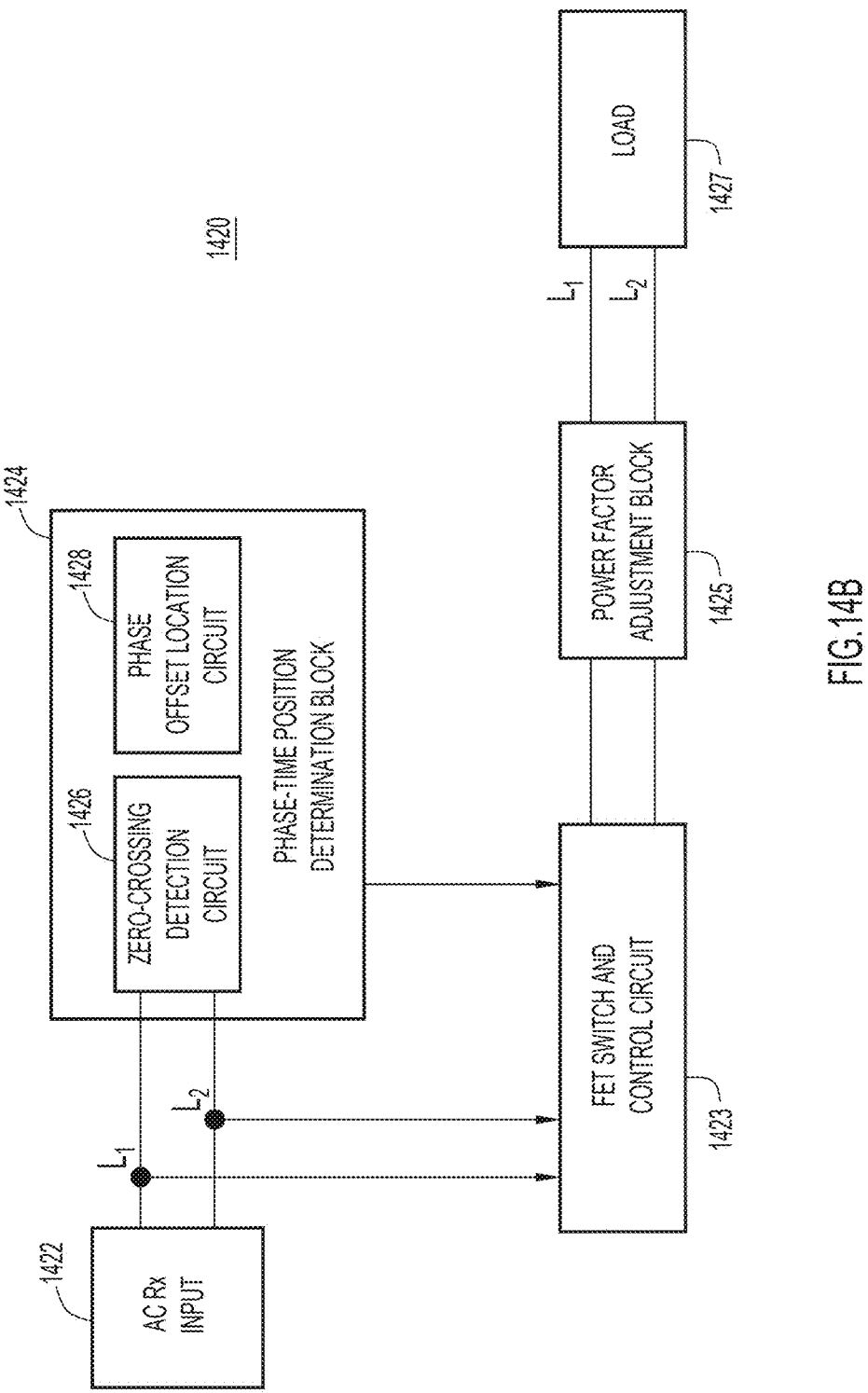

FIG. 14B illustrates a block diagram of a power receiver 1420 configured to force or induce an amount of phase shift of lead/lag between the AC current waveform and AC voltage waveform. The power receiver 1420 includes an AC Rx input 1422, a phase-time position determination block 1424 comprising a zero-crossing detection circuit 1426 and a phase offset location circuit 1428. The power receiver 1420 further includes a FET switch and control circuit 1423, a power factor adjustment block 1425 and a load 1427. The power factor adjustment block 1425 may include a bank of capacitors or a bank of inductors, and the power factor adjustment block 1425 may be a separate block that is connected between the FET switch and control circuit 1423 and the load 1427, or it may be integrated in the FET switch and control circuit 1423 or integrated with the load 1427. A given power receiver may be designed or tuned to a certain class of load that always leads, though this could be variable depending on the load.

Like the power factor adjustment block 1414 of FIG. 14A, the power factor adjustment block 1425 may be adjustable to control the amount of capacitance connected in the path of the AC power waveforms using a paralleled switch arrangement of a bank of capacitors. If the load 1427 is particularly inductive, then more capacitance may be configured in the power path in the power factor adjustment block 1425. If the load 1427 is more capacitive, then less capacitance is configured in the adjustable bank of capacitors in the power factor adjustment block 1425. For a multi-drop power distribution arrangement, backwards compatibility may be desirable to branch circuits that are by default multi-drop. The power receivers may be adaptive to account for this.

Figure 14C:
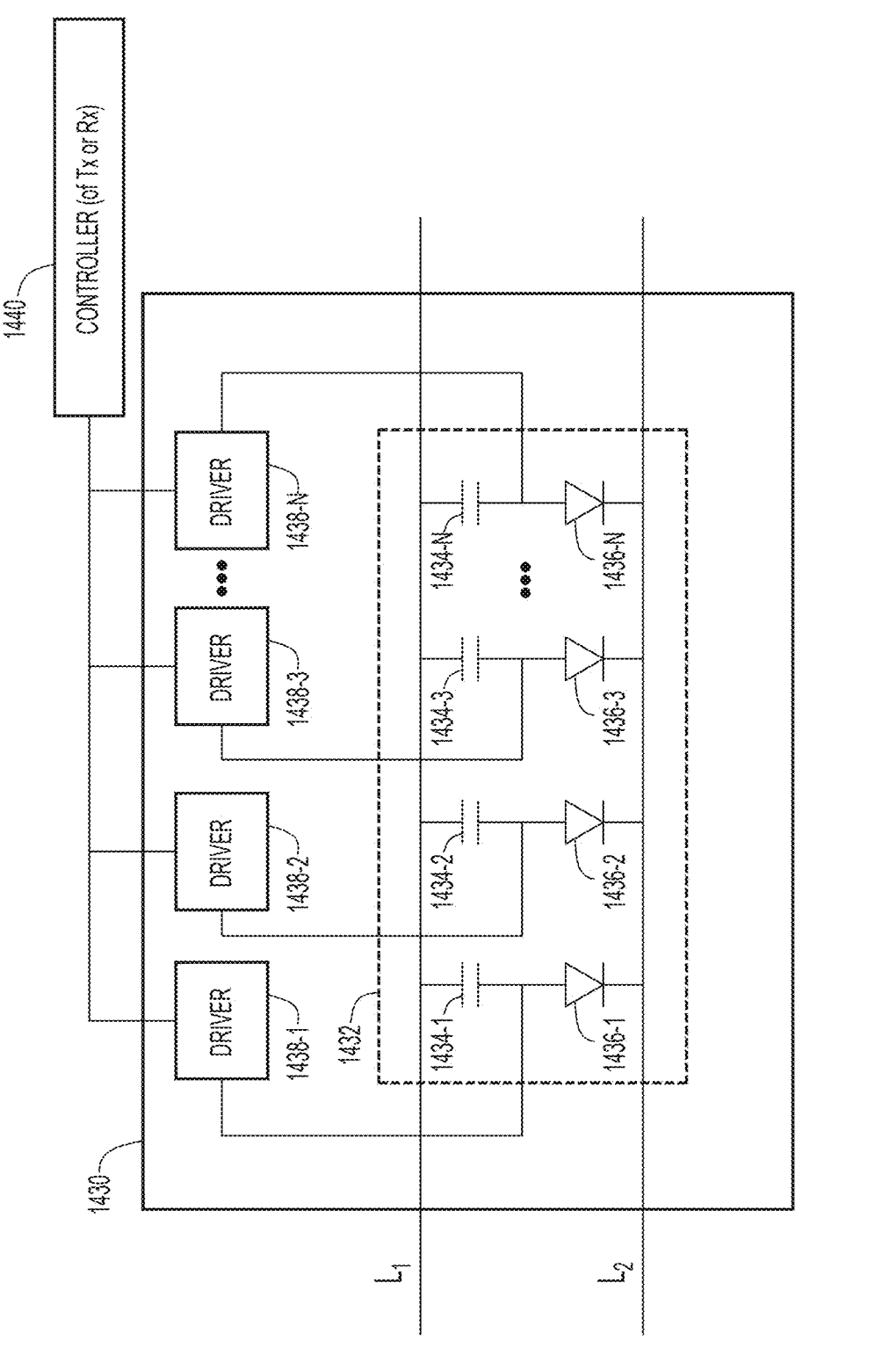
FIG. 14C is a diagram of an example arrangement for a power factor adjustment circuit that may be used in the power transmitter and/or the power receiver shown in FIGS. 14A and 14B, respectively.

FIG. 14C shows a block diagram of a power factor adjustment block 1430 that is configured to provide an adjustable amount of capacitance onto the power lines. This may be used in the example arrangements of a power transmitter and power receiver shown in FIGS. 14A and 14B, respectively. The power factor adjustment block 1430 includes a bank 1432 of capacitors 1434-1, 1434-2, 1434-3, . . . , 1434-N and associated diodes 1436-1, 1436-2, 1436-3, . . . , 1436-N connected in series with a respective one of the capacitors 1434-1 to 1434-N. In addition, there is a plurality of driver circuits 1438-1, 1438-2, 1438-3, . . . , 1438-N, each connected to an anode of a corresponding one of the diodes 1436-1 to 1436-N. A given capacitor of the plurality of capacitors 1434-1 to 1434-N is connected across the lines $L_1$ and $L_2$ when the driver circuit for the associated capacitor applies a sufficient voltage to the anode of the diode connected in series with that capacitor. Thus, the overall capacitance value that is connected across the lines $L_1$ and $L_2$ is based on how many of the driver circuits are controlled to forward bias the diodes that are connected in series with respective capacitors. A controller 1440 is coupled to the driver circuits 1438-1, 1438-2, 1438-3, . . . , 1438-N to select which one or more of the driver circuits to activate, to in turn, cause an associated capacitor of the plurality of capacitors 1434-1 to 1434-N to be connected across the lines $L_1$ and $L_2$. The total capacitance across the lines $L_1$ and $L_2$ is based on the sum of the capacitance values of the one or more capacitors of the plurality of capacitors 1434-1 to 1434-N that are caused to be connected across the lines $L_1$ and $L_2$. The controller 1440 may be a DSP or microprocessor that is already present in the power transmitter or power receiver, or it may be a dedicated controller.

Figure 15:
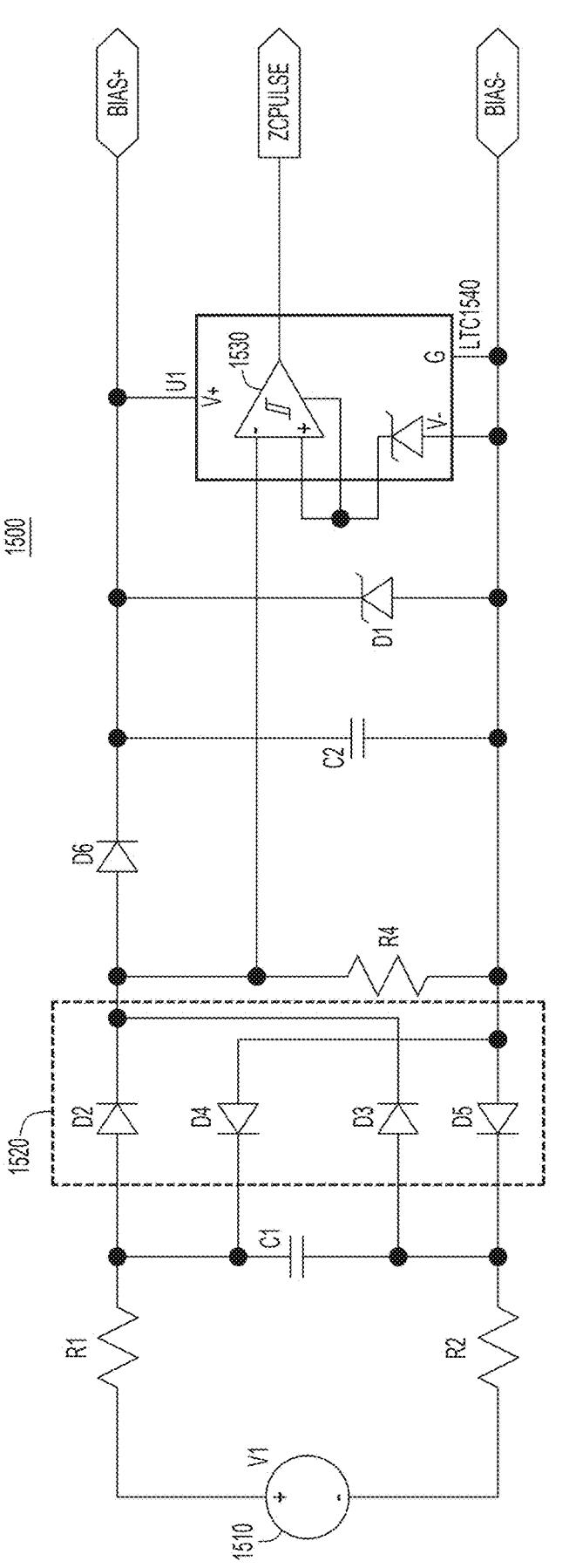
FIG. 15 is a schematic diagram of a zero-crossing detection circuit that may be used in the various embodiments presented herein, according to an example embodiment.

FIG. 15 is a schematic diagram of a zero-crossing detection circuit 1500 that may be employed in connection with the techniques presented herein, such as in the power transmitter 110 of FIG. 1B, the power receiver 120 of FIG. 1C, the power transmitter 300 of FIG. 3A, the power receiver of FIG. 4, the power transmitter 900 of FIG. 9A, the power transmitter 1400 of FIG. 14A, and the power receiver 1420 of FIG. 14B. Resistors R1 and R2 are connected to an AC supply 1510 and provide current limiting into a full diode bridge arrangement 1520 comprising diodes $D_2$, $D_3$, $D_4$ and $D_5$. Resistor R4 is connected across the full diode bridge arrangement 1520 and develops a full wave rectified voltage (rectified sinewave). Diode $D_6$ is connected to one node of resistor R4 and develops a supply voltage to run a comparator integrated circuit (IC) U1. Thus, the IC U1 includes a comparator 1530. Diode $D_1$ is a Zener diode connected across the rectified sine wave and sets the magnitude of a bias voltage that is smoothed with capacitor C2.

Zero-crossing detection is achieved by sensing the unsmoothed voltage across resistor R4 with the comparator 1530 in the comparator IC U1. The sensed voltage is compared to a reference voltage by the comparator IC U1. The comparator IC U1 outputs a pulse (ZCpulse) every instance the rectified AC voltage approaches zero voltage and remains for a similar period after zero voltage.

In summary, in some aspects, the techniques described herein relate to a method including: applying alternating current (AC) power to a pair of lines at a power transmitter to transmit the AC power to a power receiver, the AC power including an AC voltage waveform and an AC current waveform; detecting occurrence of a predetermined characteristic of the AC voltage waveform or the AC current waveform; disconnecting the AC power from the pair of lines upon detecting occurrence of the predetermined characteristic of the AC voltage waveform or the AC current waveform; performing a fault detection during a safety check time window upon disconnecting the AC power from the pair of lines; and reconnecting the AC power to the pair of lines when a fault is not detected from the fault detection during the safety check time window, and maintaining the AC power disconnected from the pair of lines when a fault is detected during the safety check time window.

In some aspects, the techniques described herein relate to a method, wherein the detecting and the disconnecting are performed at the power transmitter.

In some aspects, the techniques described herein relate to a method, wherein the predetermined characteristic is a crossing point of the AC voltage waveform or the AC current waveform.

In some aspects, the techniques described herein relate to a method, wherein the crossing point is a zero-crossing point of the AC voltage waveform or the AC current waveform, or a root mean squared (RMS) level crossing point of the AC voltage waveform or the AC current waveform.

In some aspects, the techniques described herein relate to a method, further including: applying a charging pulse of a predetermined time duration to the pair of lines after disconnecting the AC power from the pair of lines, wherein the safety check time window begins after termination of the charging pulse.

In some aspects, the techniques described herein relate to a method, wherein the predetermined characteristic is a phase offset with respect to a reference point of the AC voltage waveform or the AC current waveform.

In some aspects, the techniques described herein relate to a method, wherein the phase offset is selected so that the disconnecting is performed when the AC voltage waveform is at a level to charge the pair of lines prior to performing the fault detection during the safety check time window.

In some aspects, the techniques described herein relate to a method, wherein the phase offset is selected so that the disconnecting and the performing the fault detection are performed when the AC voltage waveform is rising and reaching a peak, and the fault detection is completed before the AC current waveform becomes non-zero.

In some aspects, the techniques described herein relate to a method, wherein the phase offset is selected so that the disconnecting and the performing the fault detection are performed when the AC voltage waveform is falling from a peak and the AC current waveform crosses zero.

In some aspects, the techniques described herein relate to a method, further including adjusting a capacitance or inductance in a path of the pair of lines or at a load of the power receiver to induce the phase offset.

In some aspects, the techniques described herein relate to a method, wherein adjusting includes controlling an amount of capacitance or inductance that is applied to the path by a power factor adjustment circuit.

In some aspects, the techniques described herein relate to a method, wherein the predetermined characteristic used to trigger the disconnecting and the performing fault detection is based on a type of fault detection to be performed on the pair of lines.

In some aspects, the techniques described herein relate to a method, further including, at the power receiver: receiving, via the pair of lines, the AC power including the AC voltage waveform or the AC current waveform; detecting occurrence of the predetermined characteristic of the AC voltage waveform or the AC current waveform received by the power; and disconnecting from the pair of lines upon detecting occurrence of the predetermined characteristic of the AC voltage waveform or the AC current waveform.

In some aspects, the techniques described herein relate to an apparatus including: an alternating current (AC) power source to provide AC power including an AC voltage waveform and an AC current waveform; a pair of lines configured to carry the AC power from the AC power source; a switch circuit connected to the pair of lines and configured to either connect the AC power to the pair of lines or disconnect the AC power from the pair of lines; a detection circuit coupled to the pair of lines and to the switch circuit, wherein the detection circuit is configured to detect a predetermined characteristic of the AC voltage waveform or the AC current waveform and provide a control output to the switch circuit to cause the switch circuit to disconnect the AC power from the pair of lines for a period of time upon detecting the predetermined characteristic; and a fault detector coupled to the pair of lines and to the switch circuit, wherein the fault detector is configured to perform a fault detection during a safety check time window after the switch circuit has disconnected the AC power from the pair of lines, wherein the fault detector is further configured to control the switch circuit to reconnect the AC power to the pair of lines when a fault is not detected during the safety check time window, and to maintain the AC power disconnected from the pair of lines when a fault is detected during the safety check time window.

In some aspects, the techniques described herein relate to an apparatus, wherein the predetermined characteristic is a crossing point of the AC voltage waveform or the AC current waveform.

In some aspects, the techniques described herein relate to an apparatus, wherein the crossing point is a zero-crossing point of the AC voltage waveform or the AC current waveform, or a root mean squared (RMS) level crossing point of the AC voltage waveform or the AC current waveform.

In some aspects, the techniques described herein relate to an apparatus, further including a pulse generator circuit configured to applying a charging pulse of a predetermined time duration to the pair of lines after disconnecting the AC power from the pair of lines, wherein the safety check time window begins after termination of the charging pulse.

In some aspects, the techniques described herein relate to an apparatus, wherein the predetermined characteristic is a phase offset with respect to a reference point of the AC voltage waveform or the AC current waveform, wherein the phase offset is selected so that the switch circuit disconnects the AC power from the pair of lines when the AC voltage waveform is at a level to charge the pair of lines prior to the fault detector performing the fault detection during the safety check time window.

In some aspects, the techniques described herein relate to an apparatus, wherein the phase offset is selected so that the switch circuit disconnects the pair of lines from the AC power and the fault detector performs the fault detection when the AC voltage waveform is rising and reaching a peak, and the fault detection is completed before the AC current waveform becomes non-zero.

In some aspects, the techniques described herein relate to an apparatus, further including a power factor adjustment circuit configured to adjust a capacitance or inductance in a path of the pair of lines or at a load of a power receiver to induce the phase offset.

In some aspects, the techniques described herein relate to an apparatus including: an alternating current (AC) power source to provide AC power including an AC voltage waveform and an AC current waveform; a pair of lines configured to carry the AC power from the AC power source; a switch circuit connected to the pair of lines and configured to either connect the AC power to the pair of lines or disconnect the AC power from the pair of lines; an analog-to-digital converter coupled to receive the AC voltage waveform and the AC current waveform carried on the pair of lines and to convert the AC voltage waveform and the AC current waveform to digital data; and a processor coupled to the analog-to-digital converter and to the switch circuit, wherein the processor is configured to: detect a predetermined characteristic of the AC voltage waveform or the AC current waveform based on the digital data and provide a control output to the switch circuit to cause the switch circuit to disconnect the AC power from the pair of lines for a period of time upon detecting the predetermined characteristic; perform fault detection during a safety check time window after the switch circuit has disconnected the AC power from the pair of lines; and control the switch circuit to reconnect the AC power to the pair of lines when a fault is not detected during the safety check time window, or control the switch circuit to maintain the AC power disconnected from the pair of lines when a fault is detected during the safety check time window.

In some aspects, the techniques described herein relate to an apparatus, wherein the predetermined characteristic is a crossing point of the AC voltage waveform or the AC current waveform.

In some aspects, the techniques described herein relate to an apparatus, wherein the crossing point is a zero-crossing point of the AC voltage waveform or the AC current waveform, or a root mean squared (RMS) level crossing point of the AC voltage waveform or the AC current waveform.

In some aspects, the techniques described herein relate to an apparatus, wherein the predetermined characteristic is a phase offset with respect to a reference point of the AC voltage waveform or the AC current waveform, wherein the phase offset is selected so that the switch circuit disconnects the AC power from the pair of lines when the AC voltage waveform is at a level to charge the pair of lines prior to the processor performing fault detection during the safety check time window.

In some aspects, the techniques described herein relate to an apparatus, wherein the phase offset is selected so that the switch circuit disconnects the pair of lines from the AC power and the processor performs the fault detection when the AC voltage waveform is rising and reaching a peak, and the fault detection is completed before the AC current waveform becomes non-zero.

In some aspects, the techniques described herein relate to an apparatus, further including a power factor adjustment circuit configured to adjust a capacitance or inductance in a path of the pair of lines or at a load of a power receiver to induce the phase offset.

In some aspects, one or more non-transitory computer readable storage media are provided that are encoded with instructions that, when executed by a processor, cause the processor to perform operations including: detecting occurrence of a predetermined characteristic of an AC voltage waveform or an AC current waveform associated with AC power applied to a pair of lines at a power transmitter that transmits the AC power to a power receiver; controlling a switch circuit to disconnect the AC power from the pair of lines upon detecting occurrence of the predetermined characteristic of the AC voltage waveform or the AC current waveform; performing a fault detection during a safety check time window upon the AC power being disconnected from the pair of lines; and controlling the switch circuit to reconnect the AC power to the pair of lines when a fault is not detected from the fault detection during the safety check time window, and controlling the switch circuit to maintain the AC power disconnected from the pair of lines when a fault is detected during the safety check time window.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) and/or storage can store data, software, code, instructions (e.g., processor instructions), logic, parameters, combinations thereof, and/or the like used for operations described herein. This includes memory element(s) and/or storage being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer/processor readable storage media (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may be directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

One or more advantages described herein are not meant to suggest that any one of the embodiments described herein necessarily provides all the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:
applying alternating current (AC) power to a pair of lines at a power transmitter to transmit the AC power to a power receiver, the AC power comprising an AC voltage waveform and an AC current waveform;
detecting occurrence of a predetermined characteristic of the AC voltage waveform or the AC current waveform;
disconnecting the AC power from the pair of lines upon detecting occurrence of the predetermined characteristic of the AC voltage waveform or the AC current waveform;
performing a fault detection during a safety check time window upon disconnecting the AC power from the pair of lines; and
reconnecting the AC power to the pair of lines when a fault is not detected from the fault detection during the safety check time window, and maintaining the AC power disconnected from the pair of lines when a fault is detected during the safety check time window.

2. The method of claim 1, wherein the detecting and the disconnecting are performed at the power transmitter.

3. The method of claim 1, wherein the predetermined characteristic is a crossing point of the AC voltage waveform or the AC current waveform.

4. The method of claim 3, wherein the crossing point is a zero-crossing point of the AC voltage waveform or the AC current waveform, or a root mean squared (RMS) level crossing point of the AC voltage waveform or the AC current waveform.

5. The method of claim 4, further comprising:
applying a charging pulse of a predetermined time duration to the pair of lines after disconnecting the AC power from the pair of lines,
wherein the safety check time window begins after termination of the charging pulse.

6. The method of claim 1, wherein the predetermined characteristic is a phase offset with respect to a reference point of the AC voltage waveform or the AC current waveform.

7. The method of claim 6, wherein the phase offset is selected so that the disconnecting is performed when the AC voltage waveform is at a level to charge the pair of lines prior to performing the fault detection during the safety check time window.

8. The method of claim 7, wherein the phase offset is selected so that the disconnecting and the performing the fault detection are performed when the AC voltage waveform is rising and reaching a peak, and the fault detection is completed before the AC current waveform becomes non-zero.

9. The method of claim 6, wherein the phase offset is selected so that the disconnecting and the performing the fault detection are performed when the AC voltage waveform is falling from a peak and the AC current waveform crosses zero.

10. The method of claim 6, further comprising adjusting a capacitance or inductance in a path of the pair of lines or at a load of the power receiver to induce the phase offset.

11. The method of claim 10, wherein adjusting comprises controlling an amount of capacitance or inductance that is applied to the path by a power factor adjustment circuit.

12. The method of claim 1, wherein the predetermined characteristic used to trigger the disconnecting and the performing fault detection is based on a type of fault detection to be performed on the pair of lines.

13. The method of claim 1, further comprising, at the power receiver:
receiving, via the pair of lines, the AC power including the AC voltage waveform or the AC current waveform;
detecting occurrence of the predetermined characteristic of the AC voltage waveform or the AC current waveform received by the power; and
disconnecting from the pair of lines upon detecting occurrence of the predetermined characteristic of the AC voltage waveform or the AC current waveform.

14. An apparatus comprising:
an alternating current (AC) power source to provide AC power comprising an AC voltage waveform and an AC current waveform;
a pair of lines configured to carry the AC power from the AC power source;
a switch circuit connected to the pair of lines and configured to either connect the AC power to the pair of lines or disconnect the AC power from the pair of lines;
a detection circuit coupled to the pair of lines and to the switch circuit, wherein the detection circuit is configured to detect a predetermined characteristic of the AC voltage waveform or the AC current waveform and provide a control output to the switch circuit to cause the switch circuit to disconnect the AC power from the pair of lines for a period of time upon detecting the predetermined characteristic; and
a fault detector coupled to the pair of lines and to the switch circuit, wherein the fault detector is configured to perform a fault detection during a safety check time window after the switch circuit has disconnected the AC power from the pair of lines, wherein the fault detector is further configured to control the switch circuit to reconnect the AC power to the pair of lines when a fault is not detected during the safety check time window, and to maintain the AC power disconnected from the pair of lines when a fault is detected during the safety check time window.

15. The apparatus of claim 14, wherein the predetermined characteristic is a crossing point of the AC voltage waveform or the AC current waveform.

16. The apparatus of claim 15, wherein the crossing point is a zero-crossing point of the AC voltage waveform or the AC current waveform, or a root mean squared (RMS) level crossing point of the AC voltage waveform or the AC current waveform.

17. The apparatus of claim 16, further comprising a pulse generator circuit configured to apply a charging pulse of a predetermined time duration to the pair of lines after disconnecting the AC power from the pair of lines, wherein the safety check time window begins after termination of the charging pulse.

18. The apparatus of claim 14, wherein the predetermined characteristic is a phase offset with respect to a reference point of the AC voltage waveform or AC current waveform, wherein the phase offset is selected so that the switch circuit disconnects the AC power from the pair of lines when the AC voltage waveform is at a level to charge the pair of lines prior to the fault detector performing the fault detection during the safety check time window.

19. The apparatus of claim 18, wherein the phase offset is selected so that the switch circuit disconnects the pair of lines from the AC power and the fault detector performs the fault detection when the AC voltage waveform is rising and reaching a peak, and the fault detection is completed before the AC current waveform becomes non-zero.

20. The apparatus of claim 18, further comprising a power factor adjustment circuit configured to adjust a capacitance or inductance in a path of the pair of lines or at a load of a power receiver to induce the phase offset.

21. An apparatus comprising:
an alternating current (AC) power source to provide AC power comprising an AC voltage waveform and an AC current waveform;
a pair of lines configured to carry the AC power from the AC power source;
a switch circuit connected to the pair of lines and configured to either connect the AC power to the pair of lines or disconnect the AC power from the pair of lines;
an analog-to-digital converter coupled to receive the AC voltage waveform and the AC current waveform carried on the pair of lines and to convert the AC voltage waveform and the AC current waveform to digital data; and
a processor coupled to the analog-to-digital converter and to the switch circuit, wherein the processor is configured to:

detect a predetermined characteristic of the AC voltage waveform or the AC current waveform based on the digital data and provide a control output to the switch circuit to cause the switch circuit to disconnect the AC power from the pair of lines for a period of time upon detecting the predetermined characteristic;
perform fault detection during a safety check time window after the switch circuit has disconnected the AC power from the pair of lines; and
control the switch circuit to reconnect the AC power to the pair of lines when a fault is not detected during the safety check time window, or control the switch circuit to maintain the AC power disconnected from the pair of lines when a fault is detected during the safety check time window.

22. The apparatus of claim 21, wherein the predetermined characteristic is a crossing point of the AC voltage waveform or the AC current waveform.

23. The apparatus of claim 22, wherein the crossing point is a zero-crossing point of the AC voltage waveform or the AC current waveform, or a root mean squared (RMS) level crossing point of the AC voltage waveform or the AC current waveform.

24. The apparatus of claim 21, wherein the predetermined characteristic is a phase offset with respect to a reference point of the AC voltage waveform or AC current waveform, wherein the phase offset is selected so that the switch circuit disconnects the AC power from the pair of lines when the AC voltage waveform is at a level to charge the pair of lines prior to the processor performing fault detection during the safety check time window.

25. The apparatus of claim 24, wherein the phase offset is selected so that the switch circuit disconnects the pair of lines from the AC power and the processor performs the fault detection when the AC voltage waveform is rising and reaching a peak, and the fault detection is completed before the AC current waveform becomes non-zero.

26. The apparatus of claim 24, further comprising a power factor adjustment circuit configured to adjust a capacitance or inductance in a path of the pair of lines or at a load of a power receiver to induce the phase offset.

* * * * *